US011003669B1

(12) United States Patent
Nelson et al.

(10) Patent No.: US 11,003,669 B1
(45) Date of Patent: May 11, 2021

(54) EPHEMERAL CONTENT DIGESTS FOR ASSISTANT SYSTEMS

(71) Applicant: Facebook, Inc., Menlo Park, CA (US)

(72) Inventors: Brian Nelson, San Francisco, CA (US); Vivek Natarajan, Palo Alto, CA (US); Shawn C. P. Mei, San Francisco, CA (US); Wenhai Yang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 233 days.

(21) Appl. No.: 16/151,040

(22) Filed: Oct. 3, 2018

Related U.S. Application Data

(60) Provisional application No. 62/660,876, filed on Apr. 20, 2018.

(51) Int. Cl.
*G06F 16/438* (2019.01)
*G06F 16/2457* (2019.01)
*G06Q 50/00* (2012.01)
*G06F 16/9535* (2019.01)

(52) U.S. Cl.
CPC .... *G06F 16/24575* (2019.01); *G06F 16/4393* (2019.01); *G06F 16/9535* (2019.01); *G06Q 50/01* (2013.01)

(58) Field of Classification Search
CPC .. G06F 16/4393; G06F 16/9535; G06Q 50/01
See application file for complete search history.

(56) References Cited

U.S. PATENT DOCUMENTS

| 7,124,123 B1 | 10/2006 | Roskind |
| 7,158,678 B2 | 1/2007 | Nagel |
| 7,397,912 B2 | 7/2008 | Aasman |
| 8,027,451 B2 | 9/2011 | Arendsen |
| 8,560,564 B1 | 10/2013 | Hoelzle |
| 8,677,377 B2 | 3/2014 | Cheyer |
| 8,935,192 B1 | 1/2015 | Ventilla |
| 8,983,383 B1 | 3/2015 | Haskin |
| 9,154,739 B1 | 10/2015 | Nicolaou |
| 9,299,059 B1 | 3/2016 | Marra |

(Continued)

FOREIGN PATENT DOCUMENTS

| AU | 2017203668 | 1/2018 |
| EP | 2530870 | 12/2012 |

(Continued)

OTHER PUBLICATIONS

U.S. Appl. No. 14/593,723, filed Jan. 9, 2015, Colin Patrick Treseler.

(Continued)

*Primary Examiner* — Grace Park
(74) *Attorney, Agent, or Firm* — Baker Botts L.L.P.

(57) ABSTRACT

In one embodiment, a method includes, by one or more computing systems, receiving, from a client system associated with a user, a request from the user for a content digest from an online social network, retrieving one or more content objects associated with the online social network that are accessible by the user, selecting one or more of the retrieved content objects to incorporate into the content digest based on their identified categories, generating one or more slides for the one or more selected content objects, respectively, wherein each slide comprises a summary and representative image of the respective selected content object, sending, to the client system of the user, instructions for presenting the content digest responsive to the request from the user, wherein the content digest comprises the one or more slides.

18 Claims, 14 Drawing Sheets

(56) References Cited

U.S. PATENT DOCUMENTS

| | | |
|---|---|---|
| 9,304,736 B1 | 4/2016 | Whiteley |
| 9,338,242 B1 | 5/2016 | Suchland |
| 9,338,493 B2 | 5/2016 | Van Os |
| 9,390,724 B2 | 7/2016 | List |
| 9,418,658 B1 | 8/2016 | David |
| 9,472,206 B2 | 10/2016 | Ady |
| 9,479,931 B2 | 10/2016 | Ortiz |
| 9,576,574 B2 | 2/2017 | van Os |
| 9,659,577 B1 | 5/2017 | Langhammer |
| 9,747,895 B1 | 8/2017 | Jansche |
| 9,792,281 B2 | 10/2017 | Sarikaya |
| 9,858,925 B2 | 1/2018 | Gruber |
| 9,865,260 B1 | 1/2018 | Vuskovic |
| 9,875,233 B1 | 1/2018 | Tomkins |
| 9,875,741 B2 | 1/2018 | Gelfenbeyn |
| 9,881,077 B1* | 1/2018 | Alfonseca ............... G06F 16/35 |
| 9,886,953 B2 | 2/2018 | Lemay |
| 9,990,591 B2 | 6/2018 | Gelfenbeyn |
| 10,042,032 B2 | 8/2018 | Scott |
| 10,134,395 B2 | 11/2018 | Typrin |
| 10,199,051 B2 | 2/2019 | Binder |
| 10,241,752 B2 | 3/2019 | Lemay |
| 10,276,170 B2 | 4/2019 | Gruber |
| 2008/0240379 A1 | 10/2008 | Maislos |
| 2011/0246383 A1* | 10/2011 | Gibson ................. G06Q 50/01 705/319 |
| 2012/0246191 A1 | 9/2012 | Xiong |
| 2012/0254188 A1* | 10/2012 | Koperski ............ G06F 16/9535 707/740 |
| 2012/0265528 A1 | 10/2012 | Gruber |
| 2013/0268839 A1 | 10/2013 | Lefebvre |
| 2013/0275138 A1 | 10/2013 | Gruber |
| 2013/0275164 A1 | 10/2013 | Gruber |
| 2014/0164506 A1 | 6/2014 | Tesch |
| 2014/0280017 A1* | 9/2014 | Indarapu ............... G06F 16/951 707/711 |
| 2015/0081674 A1* | 3/2015 | Ali ......................... H04L 51/14 707/722 |
| 2015/0179168 A1 | 6/2015 | Hakkani-Tur |
| 2016/0225370 A1 | 8/2016 | Kannan |
| 2016/0255082 A1 | 9/2016 | Rathod |
| 2016/0306505 A1* | 10/2016 | Vigneras ................ G06Q 10/10 |
| 2016/0328096 A1 | 11/2016 | Tran |
| 2016/0378849 A1 | 12/2016 | Myslinski |
| 2016/0378861 A1 | 12/2016 | Eledath |
| 2017/0091168 A1 | 3/2017 | Bellegarda |
| 2017/0132019 A1 | 5/2017 | Karashchuk |
| 2017/0353469 A1 | 12/2017 | Selekman |
| 2017/0359707 A1 | 12/2017 | Diaconu |
| 2018/0018562 A1 | 1/2018 | Jung |
| 2018/0018987 A1 | 1/2018 | Zass |
| 2018/0096071 A1 | 4/2018 | Green |
| 2018/0096072 A1 | 4/2018 | He |
| 2018/0107917 A1 | 4/2018 | Hewavitharana |
| 2018/0189629 A1 | 7/2018 | Yatziv |
| 2019/0080698 A1 | 3/2019 | Miller |

FOREIGN PATENT DOCUMENTS

| | | |
|---|---|---|
| EP | 3122001 | 1/2017 |
| WO | WO 2012/116241 | 8/2012 |
| WO | WO 2016/195739 | 12/2016 |
| WO | WO 2017/053208 | 3/2017 |
| WO | WO 2017/116488 | 7/2017 |

OTHER PUBLICATIONS

U.S. Appl. No. 15/808,638, filed Nov. 9, 2017, Ryan Brownhill.
U.S. Appl. No. 15/953,957, filed Apr. 16, 2018, Kemal El Moujahid.
U.S. Appl. No. 15/966,455, filed Apr. 30, 2018, Scott Martin.
U.S. Appl. No. 15/967,193, filed Apr. 30, 2018, Davide Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
Mari Ostendorf, et al.: Human Language Technology: Opportunities and Challenges, IEEE International Conference on Acoustics, Speech, and Signal Processing, Mar. 23, 2005.
Adam Poliak, et al.: Efficient, Compositional, Order-Sensitive n-gram Embeddings, Proceedings of the 15th Conference of the European Chapter of the Association for Computational Linguistics: vol. 2, Short Papers, pp. 503-508, Valencia, Spain, Apr. 3-7, 2017.
Chris Dyer, et al.: Recurrent Neural Network Grammars, Proceedings of NAACL-HLT 2016, pp. 199-209, San Diego, California, Jun. 12-17, 2016.
Overview of Language Technology, https://www.dfki.de/lt/lt-general.php, Feb. 15, 2018.
Jim Glass: A Brief Introduction to Automatic Speech Recognition, http://www.cs.columbia.edu/~mcollins/6864/slides/asr.pdf, Feb. 15, 2018.

(56) References Cited

OTHER PUBLICATIONS

Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/, Feb. 15, 2018.
What is Conversational AI? https://blog.salemove.com/what-is-conversational-ai/, Feb. 15, 2018.
Question Answering, https://en.wikipedia.org/wiki/Question_answering, Feb. 15, 2018.
Dialog Manager, https://en.wikipedia.org/wiki/Dialog_manager, Feb. 15, 2018.
Dialog Management, https://tutorials.botsfloor.com/dialog-management-799c20a39aad, Feb. 15, 2018.
Steeve Huang, Word2Vec and FastText Word Embedding with Gensim, https://towardsdatascience.com/word-embedding-with-word2vec-and-fasttext-a209c1d3e12c, Mar. 13, 2018.
Ashwini Challa, et al.: Generate, Filter, and Rank: Grammaticality Classification for Production-Ready NLG Systems, arXiv:1904.03279, Apr. 9, 2019.
Honglei Liu, et al.: Explore-Exploit: A Framework for Interactive and Online Learning, arXiv:1812.00116, Dec. 1, 2018.
Turniški, Filip, et al. "Analysis of 3G and 4G download throughput in pedestrian zones." 2016 International Symposium ELMAR. IEEE, Sep. 12, 2016.
Dubin, Ran, et al. "Adaptation Logic for HTTP Dynamic Adaptive Streaming using Geo-Predictive Crowdsourcing." arXiv preprint arXiv:1602.02030 (Feb. 5, 2016).
Chat Extensions, https://developers.facebook.com/docs/messenger-platform/guides/chat-extensions, Apr. 18, 2017.
Google Allo Makes Conversations Eeasier, Productive, and more Expressive, https://www.trickyways.com/2016/05/google-allo-makes-conversations-eeasier-productive-expressive/, May 19, 2016.
European search report received from the European Patent Office for European Patent Application No. 18201683.2-1222, dated Feb. 4, 2019.
European search report received from the European Patent Office for European Patent Application No. 18201685.7-1222, dated Feb. 4, 2019.
European search report received from the European Patent Office for European Patent Application No. 18201805.1-1222, dated Feb. 4, 2019.
European search report received from the European Patent Office for European Patent Application No. 18201808.5-1222, dated Feb. 4, 2019.
European search report received from the European Patent Office for European Patent Application No. 18201820.0-1222, dated Feb. 5, 2019.
European search report received from the European Patent Office for European Patent Application No. 18201826.7-1222, dated Feb. 4, 2019.
European search report received from the European Patent Office for European Patent Application No. 18203627.7-1222, dated Feb. 5, 2019.
European search report received from the European Patent Office for European Patent Application No. 18203675.6-1222, dated Feb. 5, 2019.
European search report received from the European Patent Office for European Patent Application No. 19155094.6-1218, dated Mar. 19, 2019.

\* cited by examiner

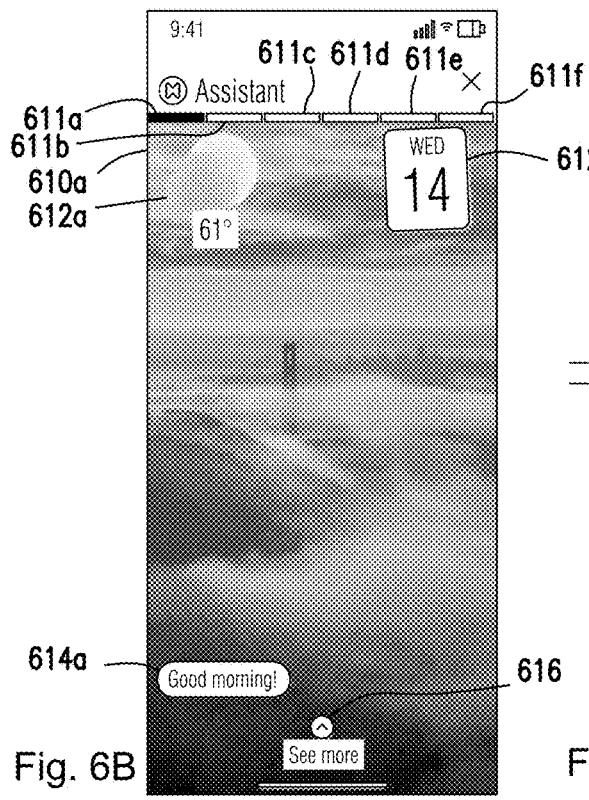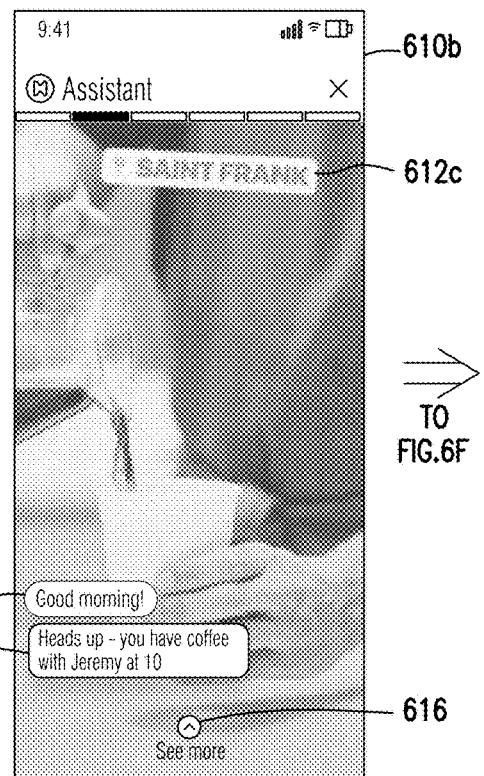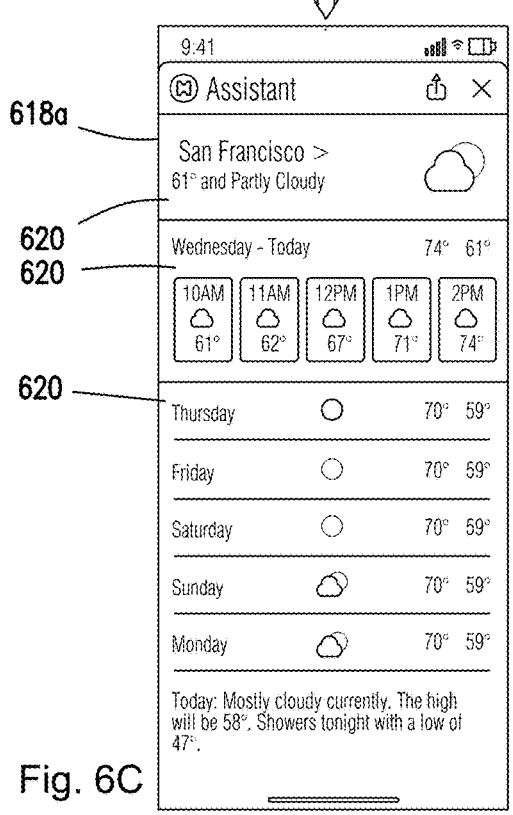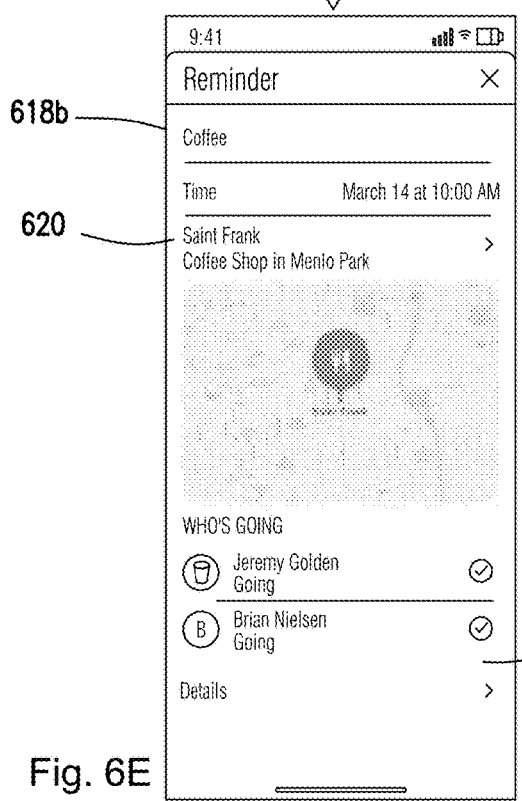

TO FIG.6J

EPHEMERAL CONTENT DIGESTS FOR ASSISTANT SYSTEMS

PRIORITY

This application claims the benefit, under 35 U.S.C. § 119(e), of U.S. Provisional Patent Application No. 62/660,876, filed 20 Apr. 2018, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/newsfeed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiment, the assistant system may provide a content digest to a user of a client system. In particular embodiments, the content digest may be in an ephemeral format (e.g., a stories format in which content is only available for a limited period). Users of an online social network may have voluminous amounts of content available to view from the online social network, and the assistant system may condense the content into a content digest that contains summaries of content that a user may be interested in and/or content that is relevant to the user. An assistant system may interface the online social network and retrieve content objects (e.g., posts, pictures, videos, articles, etc.) associated with a user's content digest to present to the user. As an example and not by way of limitation, the assistant system may generate a newsfeed digest for the user. The assistant system may generate slides for a user to view that includes content relevant to the user. Each of the slides may include further functionality to interact with the content associated with the slide. The assistant system may provide the user an expedited way to view some of the more interesting/relevant content objects on his or her content digest via a stories interface. The assistant system may receive a category identifier (category ID) for each content object. Alternatively, the assistant system may assign a category to the content object. Based on the category ID of the content object and the content of the content object, the assistant system may choose visually appealing images to represent the content object. Additionally, the assistant system may generate a summary associated with the respective content object to combine with the representative image for the respective content object. The assistant system may compile any number of slides to represent a content digest for the user. In particular embodiments, after a period of time (e.g., 24 hours), the content digest may refresh to generate a new content digest and delete the old content digest. Although this disclosure describes providing a content digest in a particular manner, this disclosure contemplates providing a content digest in any suitable manner.

In particular embodiments, the assistant system may receive a request from the first user for a content digest from an online social network. The first user may be a user of an online-social network. In particular embodiments, the assistant system 140 may retrieve one or more content objects associated with the online social network that are accessible by the first user. In particular embodiments, the assistant system 140 may determine, for each retrieved content object, a category for the retrieved content object from a plurality of categories. In particular embodiments, the assistant system may select one or more of the retrieved content objects to incorporate into the content digest based on their respective categories. In particular embodiments, the assistant system may generate, for each selected content object, a summary of the selected content object based on content of the selected content object. In particular embodiments, the assistant system may determine, for each selected content object, a representative image for the selected content object based on the content of the selected content object and the category of the selected content object. In particular embodiments, the assistant system may generate one or more slides for the one or more selected content objects, respectively. Each slide comprises the summary and representative image of the respective selected content object. In particular embodiments, the assistant system may send, to the client system of the first user, instructions for presenting the content digest responsive to the request from the first user. The content digest comprises the one or more slides.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 6A-6L illustrate example user interfaces associated with a content digest generated by the assistant system.

DESCRIPTION OF EXAMPLE EMBODIMENTS

System Overview

Figure 1:
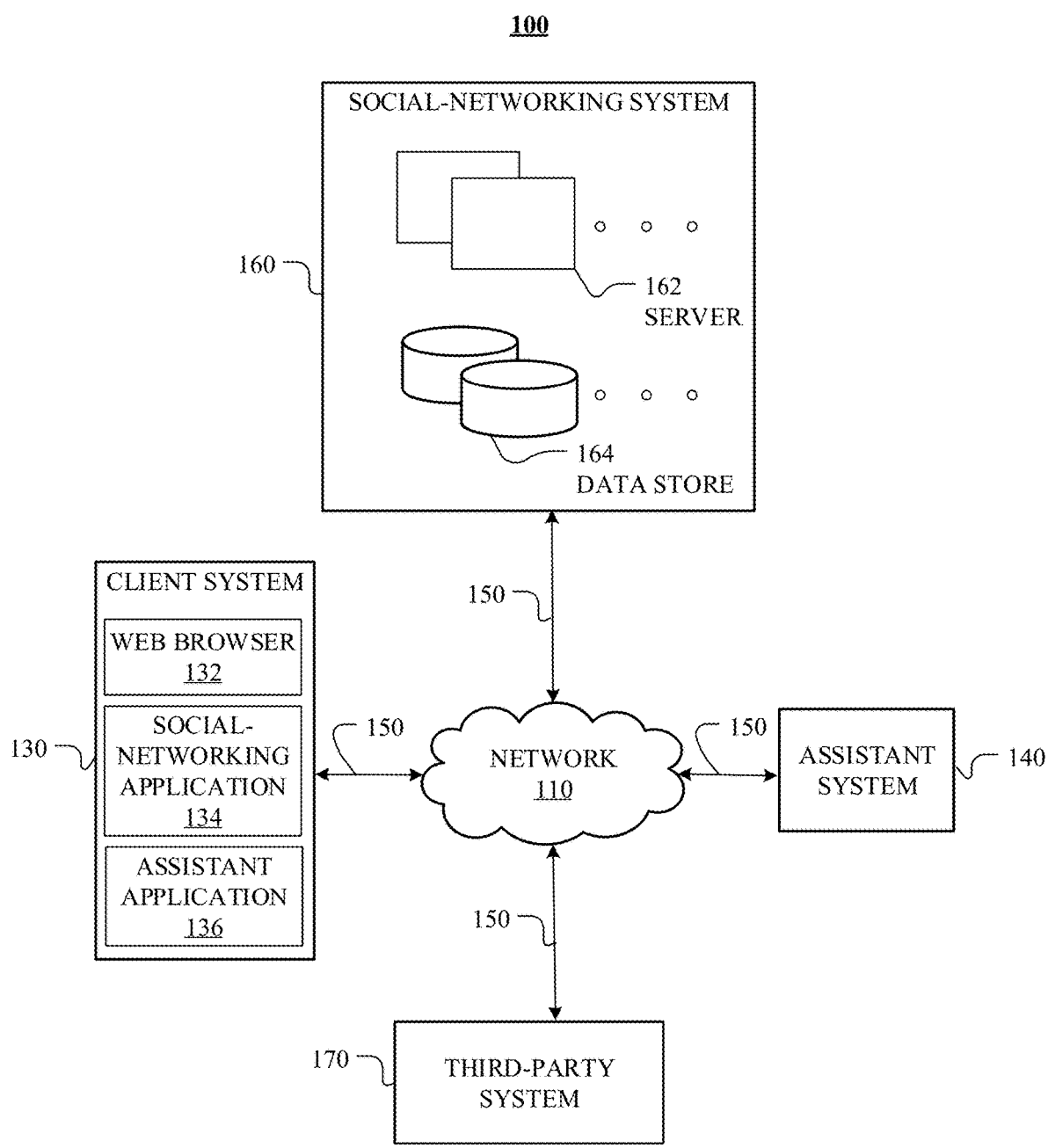
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. Design patent application No. 29/631910, filed 3 Jan. 2018, U.S. Design patent application No. 29/631747, filed 2 Jan. 2018, U.S. Design patent application No. 29/631913, filed 3 Jan. 2018, and U.S. Design patent application No. 29/631914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
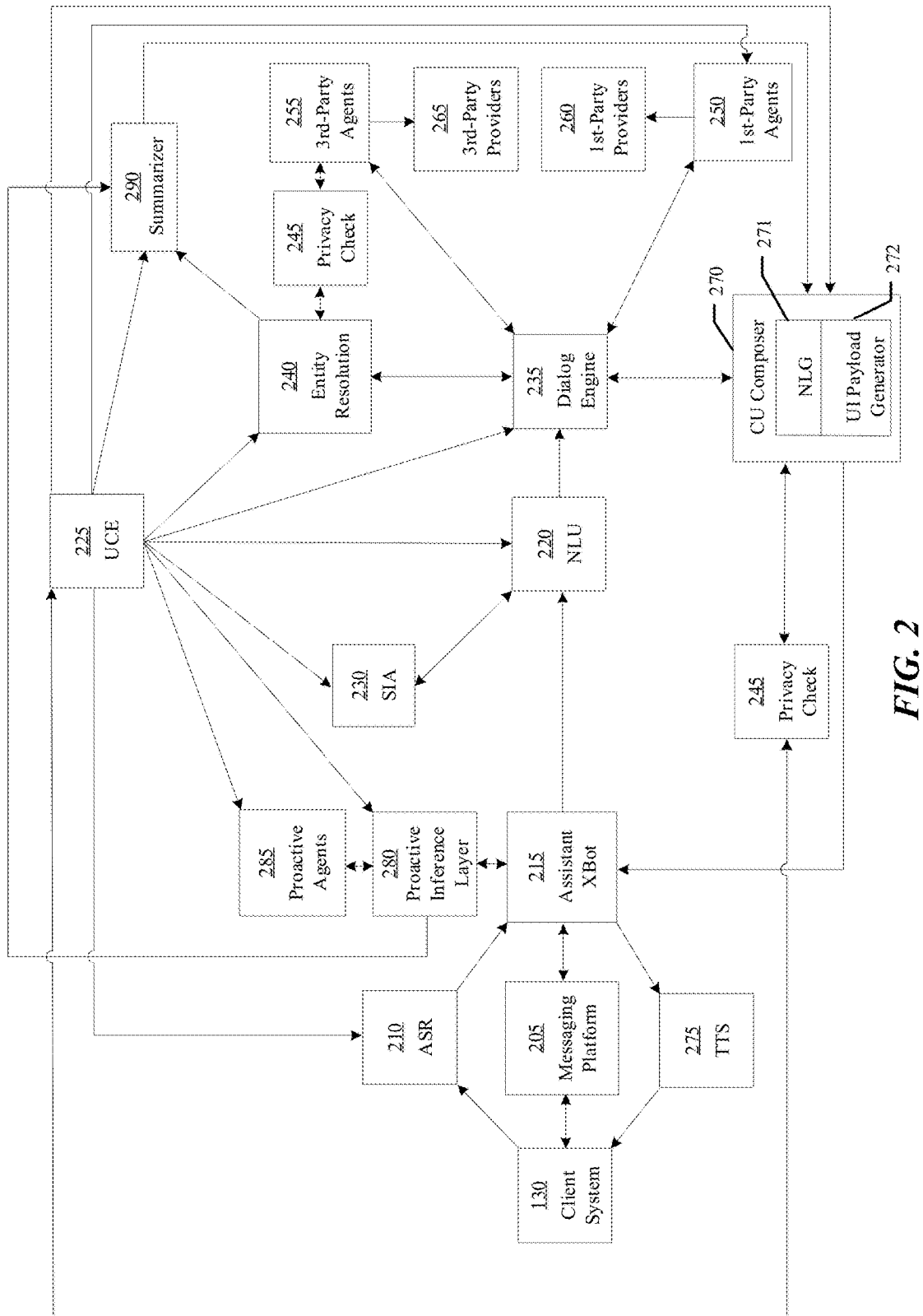
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. Patent Application No. 62/675,090, filed 22 May 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an audio speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on newsfeed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of predefined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the pre-defined taxonomy, e.g., for the input "Play Beethoven's 5th," the NLU module 220 may classify the input as having the intent [intent:play_music]. In particular embodiments, a domain may be conceptually a namespace for a set of intents, e.g., music. A slot may be a named sub-string with the user input, representing a basic semantic entity. For example, a slot for "pizza" may be [slot:dish]. In particular embodiments, a set of valid or expected named slots may be conditioned on the classified intent. As an example and not by way of limitation, for [intent:play_music], a slot may be [slot:song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., movie review sources, media databases, and entertainment content sources), and then deduped, resolved, and fused to generate the single unique record for the knowledge graph. The entity may be associated with a space attribute value which indicates the genre of the movie "The Martian" (2015). More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., music streams agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding cominstposer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized newsfeed summaries to a user. In particular embodiments, the summarizer 290 may comprise a plurality of meta agents. The plurality of meta agents may use the first-party agents 250, third-party agents 255, or proactive agents 285 to generated newsfeed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
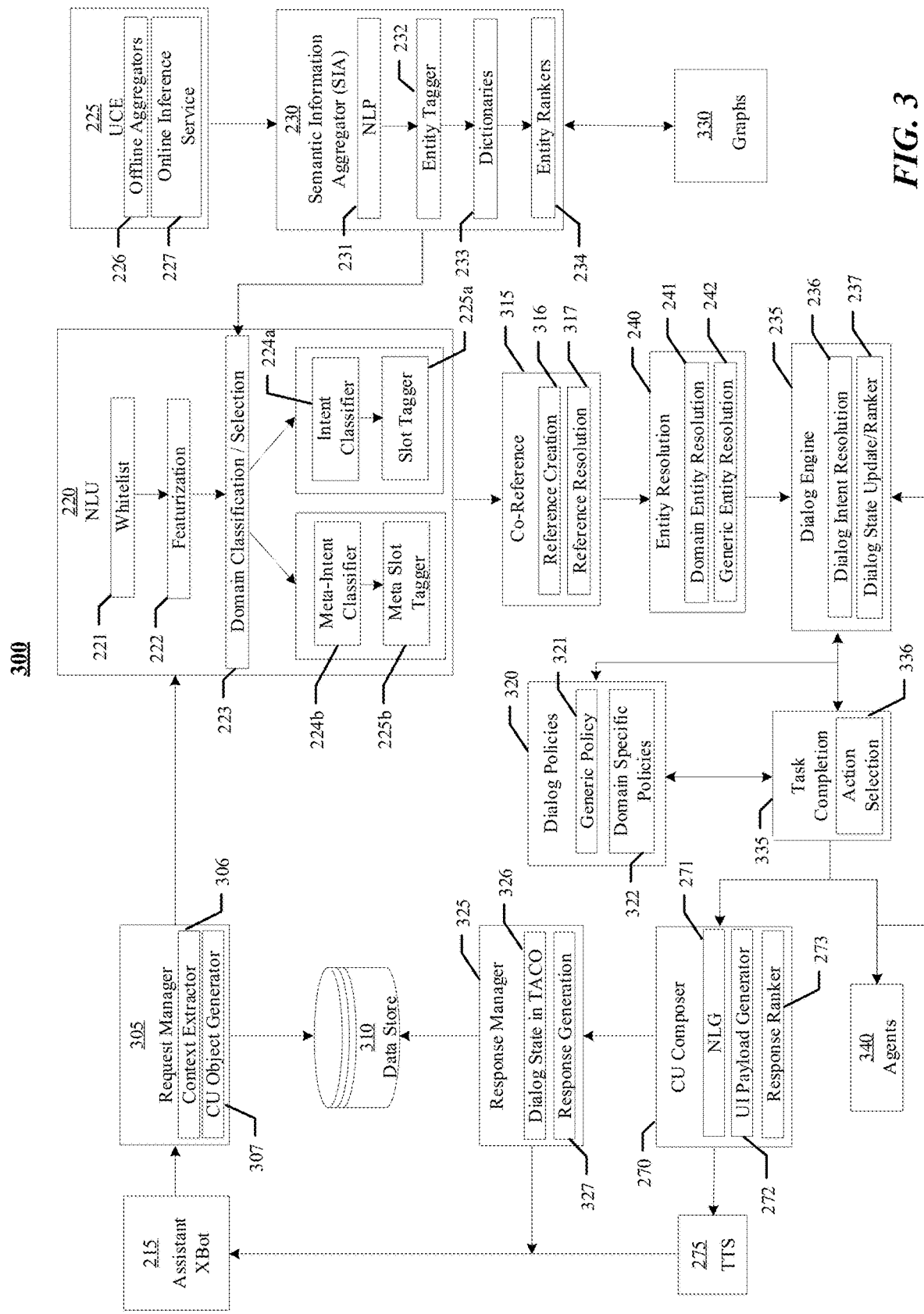
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise alarm is set on the client system 130. As another example and not by way of limitation, the update of contextual information may comprise a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step 224a, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. In particular embodiments, the slot tagger may annotate the one or more slots for the n-grams of the user request. At step 225b, the NLU module 220 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include newsfeed posts/comments, interactions with newsfeed posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item the user request refers to. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest gas station and direct me there". The co-reference module 315 may interpret "there" as "the nearest gas station". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a brand of electric car, the generic entity resolution 242 may resolve the brand of electric car as vehicle and the domain entity resolution 241 may resolve the brand of electric car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm_artist, args: {artist: "Madonna"}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, or actions with parameters. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Ephemeral Content Digests for Assistant Systems

In particular embodiments, the assistant system 140 may provide a content digest to a user of a client system 130. In particular embodiments, the content digest may be in an ephemeral format (e.g., a stories format in which content is only available for a limited period). Users of an online social network may have voluminous amounts of content available to view from the online social network, and the assistant system 140 may condense the content into a content digest that contains summaries of content that a user may be interested in and/or content that is relevant to the user. An assistant system 140 may interface the online social network and retrieve content objects (e.g., posts, pictures, videos, articles, etc.) associated with a user's content digest to present to the user. As an example and not by way of limitation, the assistant system 140 may generate a newsfeed digest for the user. The assistant system 140 may generate slides for a user to view that includes content relevant to the user. Each of the slides may include further functionality to interact with the content associated with the slide. The assistant system 140 may provide the user an expedited way to view some of the more interesting/relevant content objects on his or her content digest via a stories interface. The assistant system 140 may receive a category identifier (category ID) for each content object. Alternatively, the assistant system 140 may assign a category to the content object. Based on the category ID of the content object and the content of the content object, the assistant system 140 may choose visually appealing images to represent the content object. Additionally, the assistant system 140 may generate a summary associated with the respective content object to combine with the representative image for the respective content object. The assistant system 140 may compile any number of slides to represent a content digest for the user. In particular embodiments, after a period of time (e.g., 24 hours), the content digest may refresh to generate a new content digest and delete the old content digest. As an example and not by way of limitation, the content digest for a user may include a plurality of multimedia content consisting of images and/or videos from friends of the user posted to the online social network, where the multimedia content is presented in a full-screen vertical orientation with a timer that may automatically take the user through the multimedia content, and where the individual multimedia content may become unavailable after 24 hours. Although this disclosure describes providing a content digest in a particular manner, this disclosure contemplates providing a content digest in any suitable manner.

In particular embodiments, the assistant system 140 may receive a request from a user of a client system 130 for a content digest. The content digest may be based on content objects retrieved from an online social network or content objects retrieved from a third-party system 170 accessible by the assistant system 140. As an example and not by way of limitation, the content digest may be a newsfeed digest that comprises the latest posts that the user may be interested in viewing. As another example and not by way of limitation, the content digest may be a newsfeed digest that comprises the latest posts from third-party systems 170 (e.g., from a photo-sharing application) that the user may be interested in viewing. More information on generating content digests may be found in U.S. patent application Ser. No. 15/967,290, filed 30 Apr. 2018. The user may interact with a client system 130 that forwards the request to the assistant system 140 via the network 110. In particular embodiments, the user may be a user of an online social network. In particular embodiments, the request may be an activatable link that may be selected by the user to request a content digest. As an example and not by way of limitation, the user may select an icon associated with the content digest to access the content digest that comprises content objects that are relevant to the user. In particular embodiments, the request may automatically be sent by the assistant system 140. The assistant system 140 may periodically request a content digest to generate a content digest for the user to view prior to the user request (i.e., pre-generating the content digest). The assistant system 140 may send the request after a predetermined time period. As an example and not by way of limitation, the assistant system 140 may send a request for a content digest every few hours to update the content digest to current content objects that the user may be interested in. The preemptive request may provide the technical advantage of reducing the latency of generating the content digest in response to the request from the user, such that the content digest may be available immediately in response to the user's request. The periodic request may ensure that the content objects include relevant content objects for the user to view. In particular embodiments, the assistant system 140 may send a request for a content digest when the user accesses an application associated with the assistant system 140. As an example and not by way of limitation, the assistant system 140 may send a request to generate a newsfeed digest when a user opens a messaging application. Although this disclosure describes receiving a request for a content digest in a particular manner, this disclosure contemplates receiving a request for a content digest in any suitable manner.

In particular embodiments, the assistant system 140 may retrieve content objects associated with the online social network that are accessible by the user. The assistant system 140 may access some or all of the content objects on the online social network accessible by the user (e.g., visible to the user subject to privacy settings of associated with the content objects) and retrieve the latest content objects that the user has not seen and may want to view. In particular embodiments, the assistant system 140 may determine whether the retrieved content object is accessible by the user of the client system 130 based on a privacy setting associated with the content object. As an example and not by way of limitation, the assistant system 140 may determine whether the user of the client system 130 is connected to the user who is associated with the retrieved content object (i.e., is a first-degree friend of the user), wherein the retrieved content object is associated with privacy settings making it visible only to first-degree friends. In particular embodiments, the assistant system 140 may retrieve content objects from third-party systems 170. As an example and not by way of limitation, if the user has given access to the assistant system 140 to the user's account associated with a photo-sharing application, the assistant system 140 may retrieve posts from the photo-sharing application to be included in the content digest. In particular embodiments, the assistant system 140 may access a calendar/schedule of the user and generate a content object associated with a scheduled event (e.g., appointments, meetings, etc.) found in the calendar/schedule. As an example and not by way of limitation, if the assistant system 140 detects a coffee date scheduled at 10:00 am, the assistant system 140 may generate a content object for the coffee date. In particular embodiments, the assistant system 140 may store the retrieved content objects from the online social network in a social-networking data store. In particular embodiments, the assistant system 140 may store the retrieved contents from third-party systems 170 to a third-party data store. Although this disclosure describes retrieving content objects in a particular manner, this disclosure contemplates retrieving content objects in any suitable manner.

In particular embodiments, the assistant system 140 may determine a category for each retrieved content object from a plurality of categories. The assistant system 140 may determine what the content object relates to based on the category. As an example and not by way of limitation, the assistant system 140 may determine that a post is about dancing and categorize the post as pertaining to the dancing category. In particular embodiments, the assistant system 140 may select the category from a predetermined plurality of categories. In particular embodiments, the plurality of categories may be associated with a plurality of category-images, respectively. As an example and not by way of limitation, the nature category may be represented by a category-image of a forest surrounded by mountains. In particular embodiments, a category may have multiple category-images. In particular embodiments, each category may have a set of subcategories and there may be an associated image with respect to each subcategory. Although this disclosure describes determining a category of a content object in a particular manner, this disclosure contemplates determining a category of a content object in any suitable manner.

In particular embodiments, the assistant system 140 may select content objects to incorporate into the content digest based on their respective categories. The assistant system 140 may diversify the content digest and select content objects of different categories to include into the content digest. The assistant system 140 may use the categories of the content objects in a determination to select the content object to incorporate into the content digest. In particular embodiments, the assistant system 140 may select content objects to include in the content digest based on features of the content objects. The assistant system 140 may filter the retrieved content objects to include content objects that the user may find relevant and/or interesting. In particular embodiments, the assistant system 140 may rank the retrieved content objects based on the features of the content objects. In particular embodiments, the assistant system 140 may select the retrieved content objects to include in the content digest based on their respective ranking. In particular embodiments, the features associated with the content object may comprise one or more of social signals associated with the content object, an affinity-coefficient (as described in more detail below) of the user with respect to the content object, a relevance of the content object to the user, or an ephemerality of the content object. As an example and not by way of limitation, the assistant system 140 may select the "popular" content objects (e.g. posts) that have social signals that exceed a threshold social signal to include into the content digest. As another example and not by way of limitation, the assistant system 140 may determine an affinity of the user to each retrieved content objects and select the content objects to include the content digest that exceed a threshold affinity. The assistant system 140 may identify the category of a content object and determine that the user has an affinity towards the category associated with the content object and select the content object based on the affinity towards the category. As another example and not by way of limitation, the assistant system 140 may identify the user is planning on attending an event and select a content object associated with the event based on a determination that the content object is relevant to the user. As another example and not by way of limitation, the assistant system 140 may identify an ephemerality of a content object (e.g., an event ends at 6 PM) and select the content object to present to the user so the user is aware of the event prior to it ending. In particular embodiments, the assistant system 140 may select up to a threshold number of content objects to incorporate into the content digest. In particular embodiments, the threshold number may be a predetermined number of content objects. In particular embodiments, the assistant system 140 may select up to a number of content objects that will preoccupy the user for up to a threshold amount of time. As an example and not by way of limitation, given most content objects take a user 3 seconds to view, the assistant system 140 may select content objects to have 15 seconds worth of content objects (e.g., 5 content objects) to view. In particular embodiments, the assistant system 140 may at least select all priority content objects to include into the content digest. As an example and not by way of limitation, the assistant system 140 may select to include content objects of meetings and appointments of the user throughout the day. Although this disclosure describes selecting content objects to incorporate into a content digest in a particular manner, this disclosure contemplates selecting content objects to incorporate into a content digest in any suitable manner.

In particular embodiments, the assistant system 140 may generate a summary for each selected content object based on content of the selected content object. After the assistant system 140 selects the content objects to incorporate into the content digest, the assistant system 140 may generate a summary for each content object to describe the content object. In particular embodiments, the summary may be a conversational input by the assistant system 140 corresponding to the content object. As an example and not by way of limitation, if a content object is a coffee date at 10:00 am, the assistant system 140 may generate a text output "Heads up—you have coffee with Jeremy at 10" in relation to the coffee date content object. In particular embodiments, the summary may comprise information associated with the selected content object. As an example and not by way of limitation, if the content object is an event, the summary may indicate which friends of the user are attending the event. In particular embodiments, the summaries of the selected content object may comprise a call-to-action requesting the user to perform an action in relation to the content object. As an example and not by way of limitation, the content object may be a birthday notification of a close friend and the call-to-action may be a request to send a message to the user who has the birthday. Although this disclosure describes generating a summary for a content object in a particular manner, this disclosure contemplates generating a summary for a content object in any suitable manner.

In particular embodiments, the assistant system 140 may determine a representative image for the selected content objects. The assistant system 140 may determine the representative image based on the content of the selected content object and the category of the selected content object. In particular embodiments, the assistant system 140 may select a category-image associated with the category of the selected image as the representative image. As an example and not by way of limitation, if a coffee date category is associated with a picture of a barista pouring a cup of coffee, then the representative image of a content object of the coffee date category may be that picture of the barista pouring a cup of coffee. In particular embodiments, the representative image may be selected from the content of the selected content object. As an example and not by way of limitation, if the selected content object is an event, then the representative image may be selected from photos from the event (e.g., an event cover image). As another example and not by way of limitation, if the content object mentions "going to Golden Gate Park," then the assistant system 140 may select a picture of Golden Gate Park as a representative image of the content object. In particular embodiments, the assistant system 140 may generate an avatar to represent the sentiment of the content object to be the representative image of the content object. As an example and not by way of limitation, if the content object is a vacation trip, the avatar may be a figure with a packed suitcase to represent the content object of the vacation trip. In particular embodiments, the assistant system 140 may select the avatar from a database of generated avatars to be the representative image of a content object. In particular embodiments, the assistant system 140 may include multiple avatars to be the representative image of a content object. As an example and not by way of limitation, a birthday content object may be associated with a representative image that includes an avatar of the birthday person and the user who requested the content digest. Although this disclosure describes determining a representative image in a particular manner, this disclosure contemplates determining a representative image in any suitable manner.

In particular embodiments, the assistant system 140 may generate slides for the selected content objects. After generating a summary and representative image for each selected content object, the assistant system 140 may generate a slide that includes the representative image and the summary. In particular embodiments, the assistant system 140 may generate multiple slides for each content object. As an example and not by way of limitation, the assistant system 140 may generate a slide including the representative image and summary of the selected content object and another slide that comprises information associated with the content object. For instance, if the content object is an event, the information associated with the content object may comprise the event page associated with the event. As another example and not by way of limitation, if the content object is a notification of a user's birthday, the information associated with the content object may comprise photos of the birthday user and the user requesting the content digest. The user may share a memorable photo between them (e.g., user and birthday user) by selecting one of the photos. In particular embodiments, the assistant system 140 may generate an introductory slide that comprises information associated with the geographic location of the user to be included into the content digest. As an example and not by way of limitation, the introductory slide may comprise one or more of weather information, date information, traffic information, and the like that corresponds to the user's location. In particular embodiments, the assistant system 140 may order the generated slides of the content digest based on features associated with the slides. In particular embodiments, the assistant system 140 may rank the selected content objects based on their respective representative images. As an example and not by way of limitation, the assistant system 140 may identify social signals associated with the representative images and rank the representative images based on the social signals. The assistant system 140 may order the slides based on the rankings of their associated representative images. In particular embodiments, the features associated with the slides may comprise one or more of social signals associated with the selected content object corresponding to the slide, an affinity-coefficient of the user with respect to the selected content object corresponding to the slide, a relevance of the selected content object corresponding to the slide to the user, or a chronological relevance of the selected content object corresponding to the slide. As an example and not by way of limitation, the assistant system 140 may identify "popular" content objects based on social signals and present the slides that correspond to content objects that have higher social signals first. As another example and not by way of limitation, the assistant system 140 may determine an affinity between the user and the selected content objects and order the slides that correspond to selected content objects that have a higher affinity-coefficient first. As another example and not by way of limitation, the assistant system 140 may use both the relevance of the selected content object and the chronological relevance to order the slides. The assistant system 140 may prioritize time-sensitive content objects (e.g., meetings, appointments, etc.) first to allow the user to see those content objects first. Although this disclosure describes generating slides for the content objects in a particular manner, this disclosure contemplates generating slides for the content objects in any suitable manner.

In particular embodiments, the assistant system 140 may send instructions for presenting the content digest to the user. The assistant system 140 may send the content digest to the client system 130 of the user responsive to the request from the user. The content digest may comprise the slides that are generated from the selected content objects. In particular embodiments, the slides of the content digest are removed from the content digest after a predetermined time period. As an example and not by way of limitation, the slides may be removed from the content digest after 24 hours. In particular embodiments, the content digest may be continually updated throughout the day and old content may be removed from the content digest. In particular embodiments, the assistant system 140 may generate a notification to the user indicative of new content (e.g., new slides) in the content digest. The notification may be sent to the client system 130 from the assistant system 140. The assistant system 140 may retain the previously viewed slides and push them to the end of the content digest. In particular embodiments, the assistant system 140 may remove slides from a content digest that have been previously viewed over a predetermined time period. In particular embodiments, the user may indicate a slide is completed or has been seen and the assistant system 140 may remove the slide from the content digest. As an example and not by way of limitation, if the content digest comprises slides related to meetings the user plans to attend, the user may mark meetings that have passed as done to remove them from the content digest as "completed" or "attended." In particular embodiments, the user may interact with the content digest with a touch element (e.g., the user's finger, a stylus, etc.) The assistant system 140 may receive an indication of a gesture within any of the slides. In particular embodiments, the assistant system 140 may send instructions to the client system 130 to present information associated with the selected content object associated with the slide where an indication of a gesture is received. As an example and not by way of limitation, the user may tap on a "See More" button to view additional information related to a content object. For instance, if the slide is associated with a lunch date, then the additional information may be the lunch date details, such as location, time, attendees, etc. In particular embodiments, the information may be a list of options for the user to select. As an example and not by way of limitation, if the slide is associated with a birthday notification, the additional information may be an option to post on the birthday user's profile page, send a message to the birthday user, send a gift to the birthday user, etc. In particular embodiments, the indication of the gesture may be to transition between slides. As an example and not by way of limitation, a tapping gesture on one side of the slide may progress through the slides of the content digest. In particular embodiments, the information associated with the selected content object may comprise an activatable link to perform a context switch. As an example and not by way of limitation, the activatable link may perform a context switch to the content object associated with the slide. For instance, if the slide is associated with a post, the activatable link may perform a context switch to the post. In particular embodiments, the information may be presented on a separate slide associated with the slide the information corresponds to. In particular embodiments, the assistant system 140 may generate the slide that comprises the information when the assistant system 140 receives the gesture. In particular embodiments, the assistant system 140 may preemptively generate the slides for the content digest and the associated slides containing the information. In particular embodiments, the assistant system 140 may send the content digest that comprises the slides and the associated slides containing the information to the client system 130. The client system 130 may present the content digest to the user without needing to communicate with the assistant system 140. In particular embodiments, the content digest may be stored in a local cache of the client system 130. In particular embodiments, the slides may comprise the previous slide's summaries. As an example and not by way of limitation, if the first slide's summary is the text output "Good morning" then the second slide may comprise the text output "Good morning" and the summary associated with the second slide. In particular embodiments, up to a threshold number of summaries may be displayed on the slide. As an example and not by way of limitation, even if there are 5 slides in a content digest, only the summaries of the last two slides may be shown in addition to the summary of the current slide. In particular embodiments, the summaries may be visually manipulated to highlight the summary of the current slide. As an example and not by way of limitation, the current summary may be displayed in an opaque manner and the previous summaries may be displayed in a transparent manner. Although this disclosure describes sending instructions for presenting a content digest in a particular manner, this disclosure contemplates sending instructions for presenting the content digest in any suitable manner.

Figure 4:
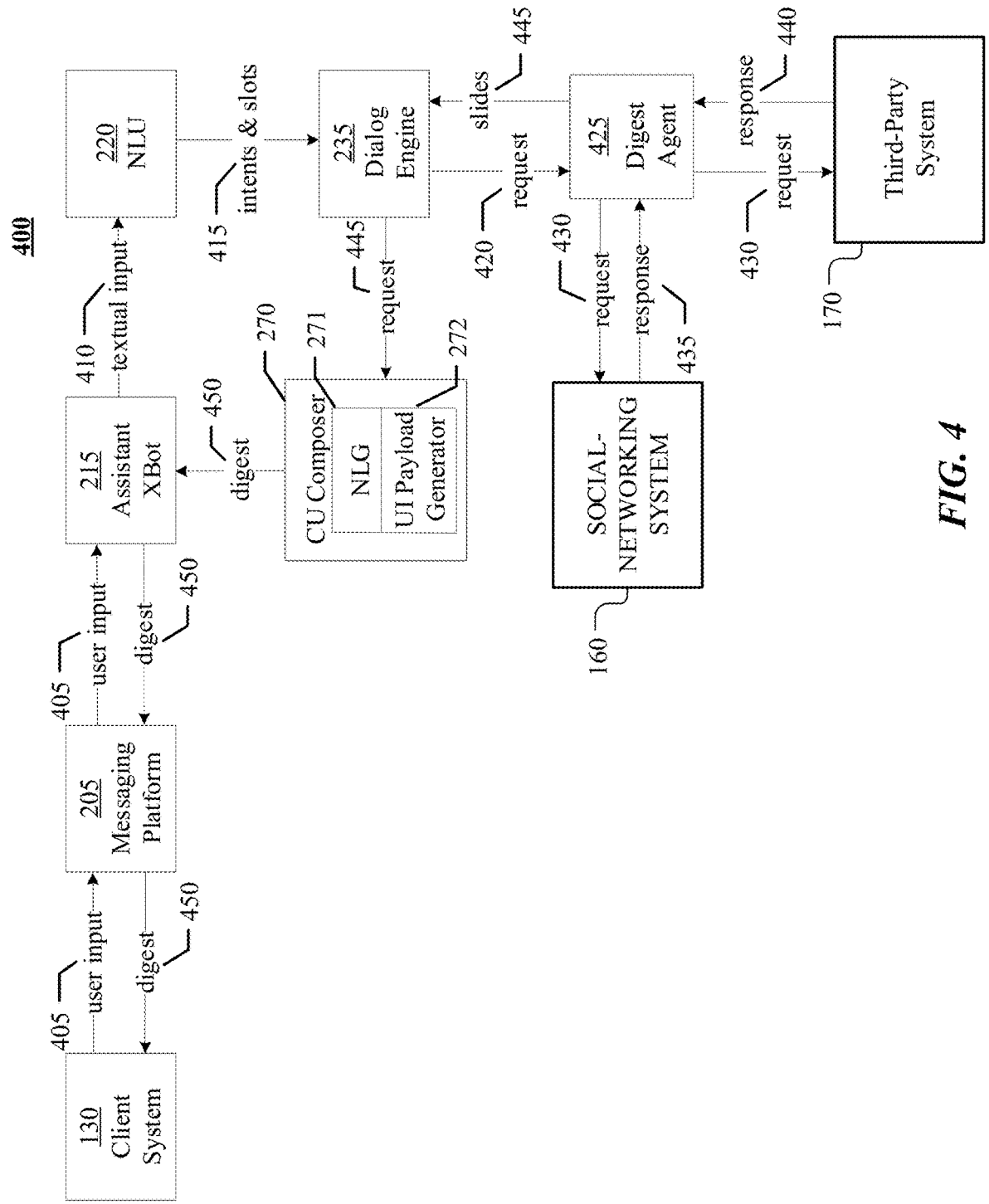
FIG. 4 illustrates an example diagram flow of providing a content digest.

FIG. 4 illustrates an example diagram flow 400 of providing a content digest. The process begins with the client system 130 receiving a user input 405 from a user. In particular embodiments, the messaging platform 205 may receive the user input 405 from the client system 130. The user input 405 may comprise one or more of a character string, an audio clip, an image, or a video clip. In particular embodiments, the assistant xbot 215 may receive the user input 405 from the messaging platform 205. The assistant xbot 215 may generate a textual input 410 from the user input 405. In particular embodiments, the assistant xbot 215 may send the textual input 410 to the NLU module 220. The NLU module 220 may identify one or more intents and one or more slots 415 based on the textual input 410 of the user input 405. After identifying the intents and slots 415, the NLU module 220 may send the intents and slots 415 to the dialog engine 235. In particular embodiments, the intents & slots 415 may comprise a request for a content digest. As an example and not by way of limitation, the content digest may be a newsfeed digest and may include the most recent posts accessible to the user and messages to the user. In particular embodiments, the content digest may be in an ephemeral format. In particular embodiments, the dialog engine 235 may determine that the received intents and slots 415 correspond to a request for a content digest. In particular embodiments, the dialog engine 235 may send the intents and slots 415 to a first-party agent 250 or a third-party agent 255 to determine the intents and slots 415 correspond to a request for a content digest. In particular embodiments, the dialog engine may send a request 420 to a digest agent 425 to generate a content digest for the user. In particular embodiments, the digest agent 425 may send a request 430 to a social-networking system 160 to retrieve content objects that are accessible to the user. As an example and not by way of limitation, the request 430 may comprise a user ID of the user and the social-networking system 160 may retrieve the latest content objects that are accessible to the user and send it to the digest agent 425. The social-networking system 160 may send a response 435 comprising the content objects associated with the online social network that are accessible to the user. In particular embodiments, the digest agent 425 may send a request 430 to one or more third-party systems 170 for content objects that are accessible to the user. As an example and not by way of limitation, the digest agent 425 may send a request 430 comprising a user ID associated with the user's account on a third-party photo-sharing application. The third-party system 170 may send a response 440 containing content objects that are accessible to the user. As an example and not by way of limitation, a photo-sharing application may send the latest posts that may be viewable by the user to the digest agent 425. In particular embodiments, the digest agent 425 may perform a filtering to select content objects that the user may want to see. The digest agent 425 may perform the filtering process by ranking the retrieved content objects based on the content objects' features. The digest agent 425 may select the content objects to incorporate into the content digest based on their rankings. In particular embodiments, the features in which the digest agent 425 may use to rank the content objects may comprise social signals of the content object, an affinity-coefficient of the user with respect to the content object, a relevance of the content object to the user, and/or an ephemerality of the content object. In particular embodiments, the digest agent 425 may access a user profile of the user through the user context engine 225. The digest agent 425 may identify the content objects that the user would like to view based on the user profile. In particular embodiments, the digest agent 425 may select up to a threshold amount of content objects to incorporate into the content digest as described above. After the digest agent 425 selects the content objects to incorporate into the content digest, the digest agent 425 may generate slides for each selected content object. Each of the slides may comprise a representative image of the selected content object and a summary of the content object. In particular embodiments, the representative image may be selected from a plurality of images associated with a plurality of categories. The digest agent 425 may determine the category of the selected content object and determine a representative image for the selected content object based on the category and the content of the selected content object. The digest agent 425 may generate the summary based on the content of the selected content object. In particular embodiments, the digest agent 425 may order the slides based on features associated with the slides. The features may comprise one or more of social signals associated with the selected content object that corresponds to the slide, an affinity-coefficient of the user with respect to the selected content object corresponding to the slide, a relevance of the selected content object corresponding to the slide to the user, or a chronological relevance of the selected content object corresponding to the slide. After the digest agent 425 generates the slides to incorporate into a content digest, the digest agent 425 may send the slides 445 to the dialog engine 235. In particular embodiments, the dialog engine 235 may send a request 445 to the CU composer 270 to prepare the slides into a content digest. In particular embodiments, the CU composer 270 may modify the summaries associated with the slides to include language the user is more familiar with. As an example and not by way of limitation, for a summary "You have coffee with Jeremy at 10," the CU composer 270 may modify the summary to be "Heads up—you have coffee with Jeremy at 10." After the CU composer 270 modifies the slides, the CU composer 270 may generate the content digest 450 to send to the assistant xbot 215. In particular embodiments, the assistant xbot 215 may pass the content digest 450 to the messaging platform 205. In particular embodiments, the messaging platform 205 may pass the digest 450 to the client system 130.

Figure 5:
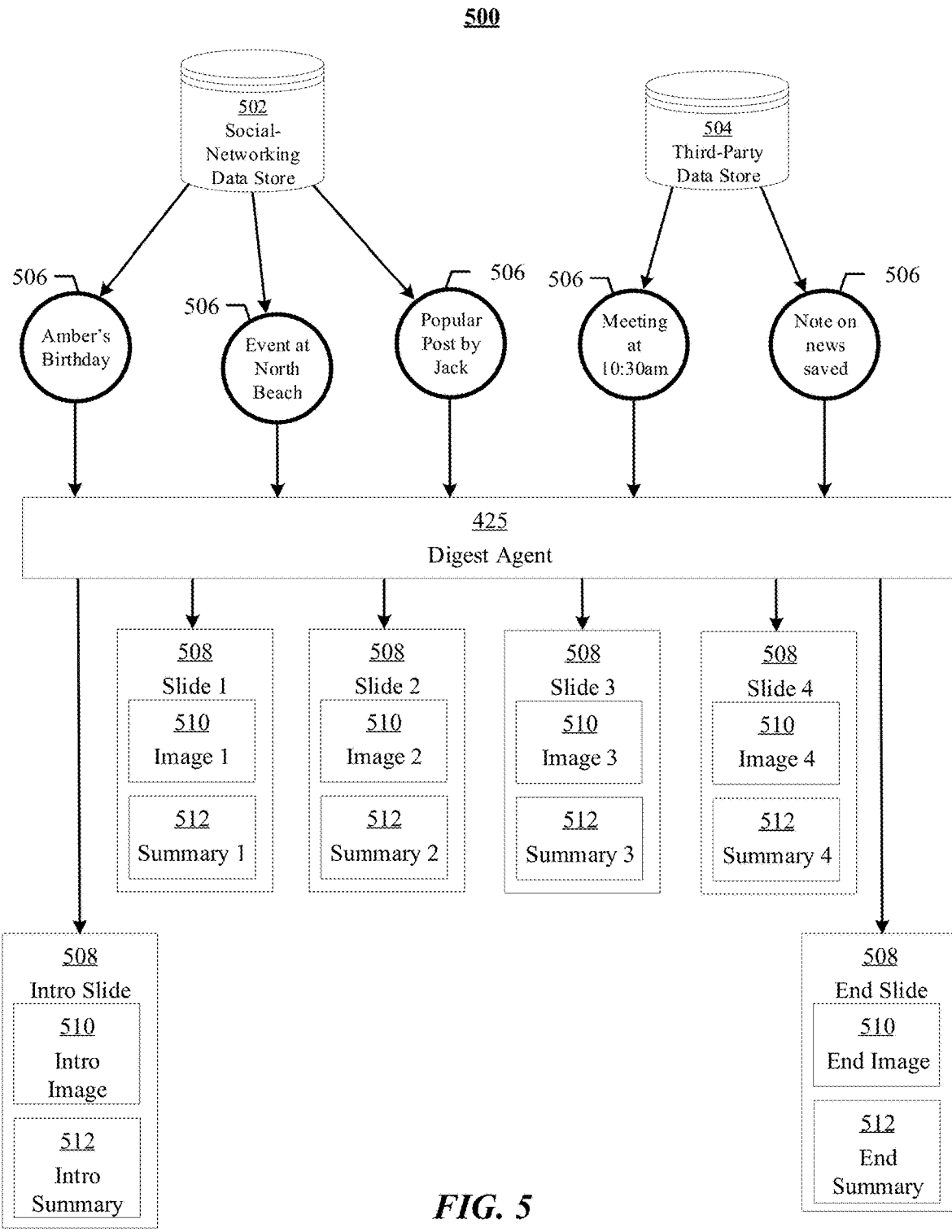
FIG. 5 illustrates an example process of generating a content digest to present to the user.

FIG. 5 illustrates an example process 500 of generating a content digest to present to the user. In particular embodiments, the assistant system 140 may access a social-networking data store 502 and a third-party data store 504 to retrieve content objects 506 that may be accessible by the user. In particular embodiments, the data store 310 may comprise the social-networking data store 502 and the third-party data store 504. In particular embodiments, the social-networking data store 502 may comprise the data store 164 or contents of the data store 164. In particular embodiments, the assistant system 140 may retrieve the content objects 506 and input them into the digest agent 425 to perform an analysis on which content objects 506 to select to be included into the content digest. The digest agent 425 may generate a plurality of slides 508 for the selected content objects 506. In particular embodiments, the digest agent 425 may determine a representative image 510 and a summary 512 for each of the slides 508. In particular embodiments, the digest agent 425 may generate an introductory slide 510 that may comprise information associated with the geographic location of the user requesting the content digest. The introductory slide may personalize the content digest further to indicate that the focus is about the user. In particular embodiments, the digest agent 425 may generate an end slide 508 that comprises an end image 510 and an end summary 512. In particular embodiments, the slides 508 may comprise summaries 512 of one or more of the other slides 508. The digest agent 425 may pass the generated slides to the dialog engine 235 as described above.

Figure 6A:
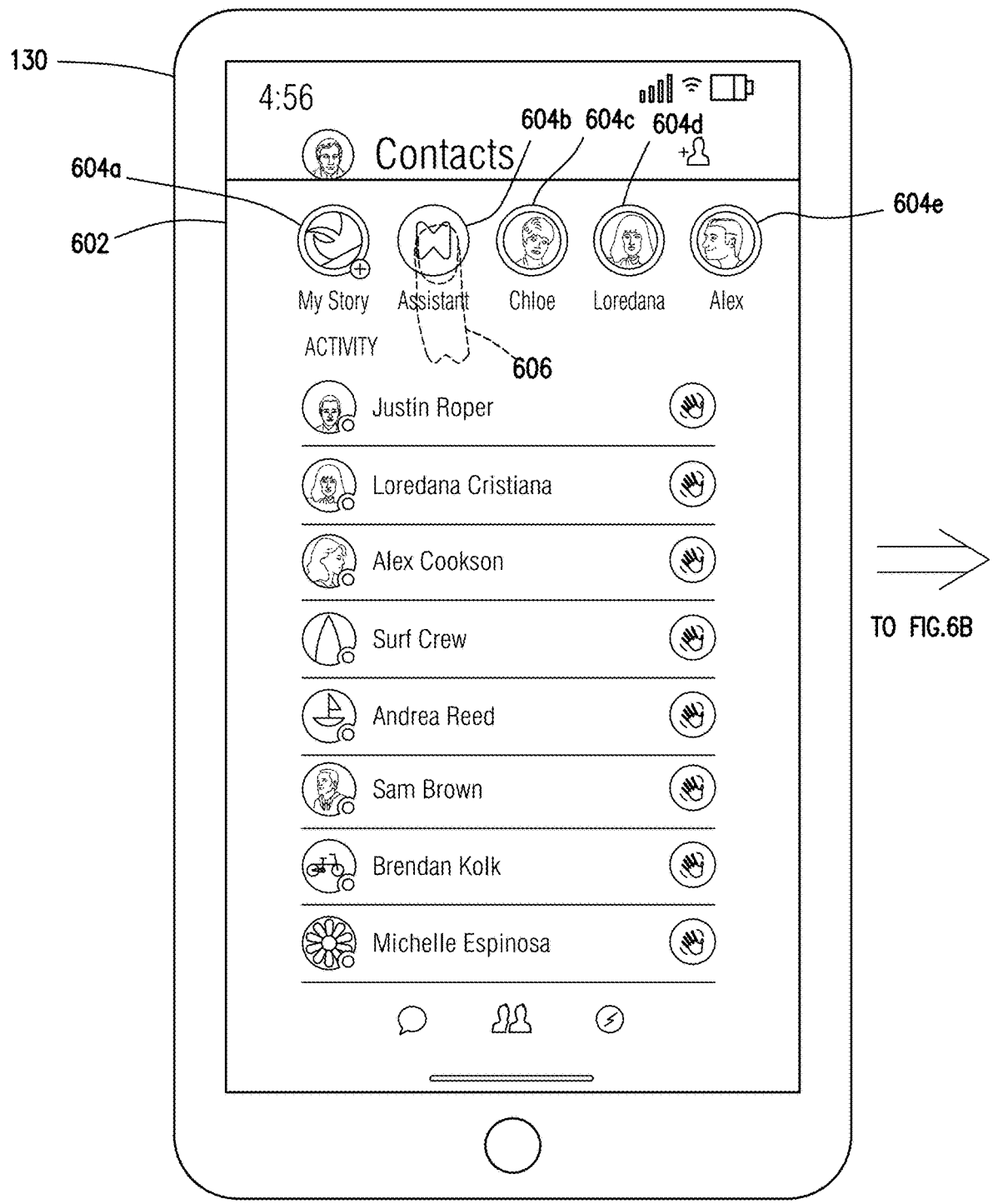

FIGS. 6A-6L illustrate example user interfaces associated with a content digest generated by the assistant system 140. Referring to FIG. 6A, a client system 130 may display a context 602 where a user may be interacting with a messaging application. The context 602 may comprise a plurality of activatable links 604a-604e that the user may select to view content and the context 602 may comprise a plurality of icons associated with message threads with users of an online social network. In particular embodiments, the activatable links 604c-604e may comprise content generated by other users of an online social network. In particular embodiments, the activatable link 604a may comprise a link to the user's own content shared on a messaging application. In particular embodiments, the activatable links 604a-604e are embodied as icons. In particular embodiments, the icons may represent the user associated with the content of the activatable link 604. In particular embodiments, the activatable link 604b may correspond to a content digest generated personalized for the user of the client system 130 as described above. As shown in FIG. 6A, the user may select the activatable link 604b to perform a request for a content digest via a touch element 606. In particular embodiments, the touch element 606 may be a finger of the user. In particular embodiments, the activatable link 604b may initiate a request for a content digest, where the assistant system 140 may generate the content digest for the user. In particular embodiments, the activatable link 604b may be a link to access a content digest previously generated for the user that is stored on the client system 130.

FIG. 6B illustrates the result of selecting the activatable link 604b, which presents a first slide 610a of the content digest to the user. In particular embodiments, the first slide 610a is presented on the client system 130. In particular embodiments, the first slide 610a may comprise a progress bar 611 that comprises indicators 611a-611f, a plurality of slide elements 612a, 612b, a summary 614a, and an activatable link 616. In particular embodiments, the progress bar 611 may indicate which slide of the content digest the user is in through the indicators 611a-611f. As shown in FIG. 6B, the first indicator 611a is darkened out and indicates that the user is within the first slide 610a. In particular embodiments, the indicator 611a may represent a timer before the client system 130 proceeds to the next slide 610b. In particular embodiments, the first slide 610a may comprise information associated with the geographic location of the user of the client system 130. As an example and not by way of limitation, the assistant system 140 may detect the user is located in San Francisco and generate the first slide 610a to comprise weather information of San Francisco as shown by slide element 612a. In particular embodiments, the summary 614a may comprise a text output to the user corresponding to the contents of the slide. As an example and not by way of limitation, the first slide 610a may want to greet the user of the client system 130 by generating the text output "Good morning!" in the summary 614a. In particular embodiments, the user may select the activatable link 616 to see more information associated with the content of the first slide 610a. FIG. 6C illustrates the result of the user selecting the activatable link 616, which pulls more information related to the contents of the first slide 610a in a separate context 618a. In particular embodiments, the separate context 618a may comprise a separate slide, another context of another application, one or more options related to the content of the first slide 610a, and the like. In particular embodiments, the options related to the content of the first slide 610a may comprise an option to view the weather related to the geographic location of the user, an option to view the traffic information related to the geographic location of the user, or an option to view events that are occurring within the local area related to the geographic location of the user. The separate context 618a may comprise one or more elements 620 that correspond to the content of the first slide 610a. As an example and not by way of limitation, the separate context 618a may comprise a scrollable box 620 to view the weather throughout the day. As another example and not by way of limitation, the separate context 618a may comprise a scrollable box to view the temperature throughout the week. Referring back to FIG. 6A, the user may also perform a gesture to access the separate context 618a. As an example and not by way of limitation, the user may perform a swipe up gesture or a tapping gesture to access the separate context 618a. In particular embodiments, the user may perform a gesture to proceed through the content digest. The assistant system 140 may receive an indication of the gesture and send instructions to the client system 130 to present the next slide 610b. In particular embodiments, the client system 130 may process the gesture and present the next slide 610b. As an example and not by way of limitation, the user may tap the right side of the first slide 610a to proceed to the next slide 610b. As another example and not by way of limitation, the user may tap on the left side of the first slide 610a to return back to the context 602.

FIG. 6D illustrates the result of performing a gesture to proceed to the second slide 610b, which presents the second slide 610b corresponding to a coffee date event. In particular embodiments, the second slide 610b comprises slide element 612c, summaries 614a, 614b, and an activatable link 616. The progress bar 611 may indicate the user is on the second slide 610b by darkening indicator 611b. The second slide 610b may comprise the previous summary 614a and the current summary 614b corresponding to the content of the second slide 610b. In particular embodiments, the summary 614b may be a reminder of the content associated with the second slide 610b. As an example and not by way of limitation, the summary 614b may indicate that the user has an event scheduled at 10 later in the day. In particular embodiments, the slide element 612c may indicate an attribute of the content object associated with the second slide 610b. As an example and not by way of limitation, the slide element 612c may represent the location of the coffee date the user has scheduled later. In particular embodiments, the user may select the activatable link 616 to see more information associated with the content of the second slide 610b. FIG. 6E illustrates the result of the user selecting the activatable link 616 within the second slide 610b, which pulls more information related to the contents of the second slide 610b in a separate context 618b. In particular embodiments, the separate context 618b may comprise a separate slide, another context of another application, one or more options related to the content of the second slide 610b, and the like. In particular embodiments, the one or more options related to the second slide 610b may comprise to cancel the event, reschedule the event, or message the participants of the event. The separate context 618b may comprise one or more elements 620 that correspond to the content of the second slide 610b. As an example and not by way of limitation, the separate context 618b comprises a location indicator 620 that may be selected by the user. In particular embodiments, if the user selects the location indicator 620, the client system 130 may access a navigation application to find the location of the event. As another example and not by way of limitation, the separate context 618*b* may have a details element 620 that the user may access to view details of the event. In particular embodiments, the separate context 618*b* may comprise additional elements 620 not discussed. Referring back to FIG. 6D, the user may also perform a gesture to access the separate context 618*b*. As an example and not by way of limitation, the user may perform a swipe up gesture or a tapping gesture to access the separate context 618*b*. In particular embodiments, the user may perform a gesture to proceed through the content digest. The assistant system 140 may receive an indication of the gesture and send instructions to the client system 130 to present the next slide 610*c*. In particular embodiments, the client system 130 may process the gesture and present the next slide 610*c*. As an example and not by way of limitation, the user may tap the right side of the second slide 610*b* to proceed to the next slide 610*c*. As another example and not by way of limitation, the user may tap on the left side of the second slide 610*b* to return back to the first slide 610*a*.

Figure 6F:
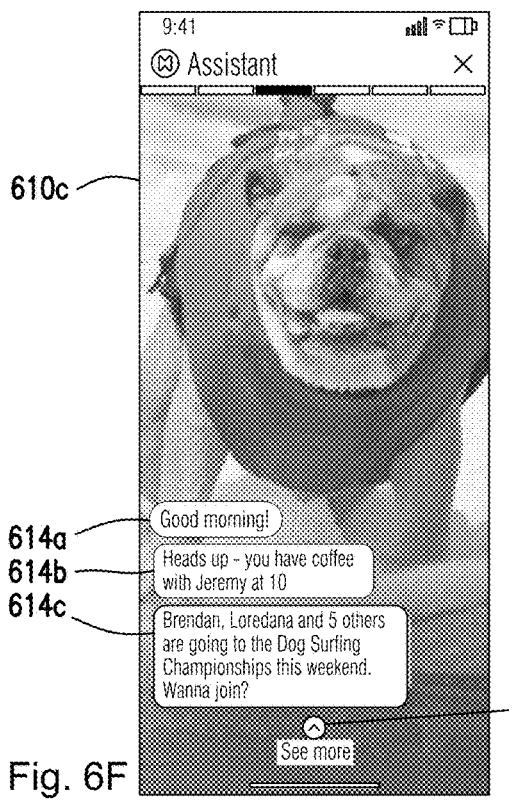

FIG. 6F illustrates the result of performing a gesture to proceed to the third slide 610*c*, which presents the third slide 610*c* corresponding to an event the user may want to attend. In particular embodiments, the third slide 610*c* comprises summaries 614*a*, 614*b*, 614*c* and an activatable link 616. The progress bar 611 may indicate the user is on the third slide 610*c* by darkening indicator 611*c*. The third slide 610*c* may comprise the previous summaries 614*a*, 614*b* and the current summary 614*c* corresponding to the content of the third slide 610*c*. In particular embodiments, the summary 614*c* may be a indication associated with the third slide 610*c*. As an example and not by way of limitation, the summary 614*c* may indicate a number of the user's friends are attending the event. In particular embodiments, the user may select the activatable link 616 to see more information associated with the content of the third slide 610*c*. FIG. 6G illustrates the result of the user selecting the activatable link 616 within the third slide 610*c*, which pulls more information related to the contents of the third slide 610*c* in a separate context 618*c*. In particular embodiments, the separate context 618*c* may comprise a separate slide, another context of another application, one or more options related to the content of the second slide 610*c*, and the like. In particular embodiments, the one or more options may comprise selecting the user is interested in attending the event, selecting the user is going to the event, or sharing the event details. The separate context 618*c* may comprise one or more elements 620 that correspond to the content of the third slide 610*c*. As an example and not by way of limitation, the separate context 618*c* comprises a status indicator 620 of the user in relation to the event corresponding to the third slide 610*c*. In particular embodiments, the user may select a particular status within the separate context 618*c*, which may update the event details to acknowledge the user's status. As another example and not by way of limitation, the separate context 618*b* may have a details element 620 that the user may access to view details of the event. In particular embodiments, the separate context 618*c* may comprise additional elements 620 not discussed. Referring back to FIG. 6F, the user may also perform a gesture to access the separate context 618*c*. As an example and not by way of limitation, the user may perform a swipe up gesture or a tapping gesture to access the separate context 618*c*. In particular embodiments, the user may perform a gesture to proceed through the content digest. The assistant system 140 may receive an indication of the gesture and send instructions to the client system 130 to present the next slide 610*d*. In particular embodiments, the client system 130 may process the gesture and present the next slide 610*d*. As an example and not by way of limitation, the user may tap the right side of the third slide 610*c* to proceed to the next slide 610*d*. As another example and not by way of limitation, the user may tap on the left side of the third slide 610*c* to return back to the second slide 610*b*.

Figure 6H:
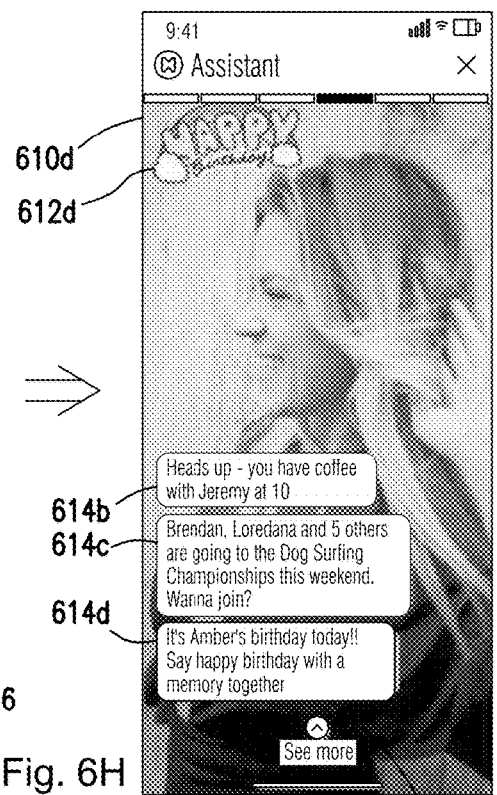
Figure 6G:
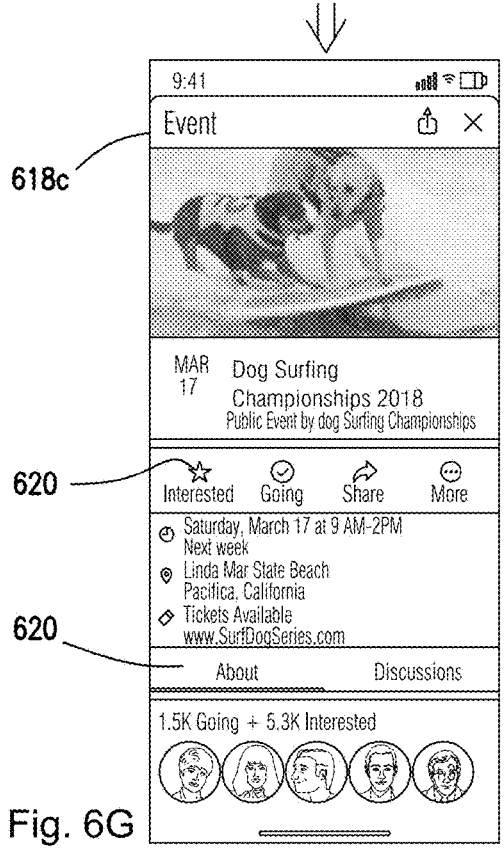
Figure 6I:
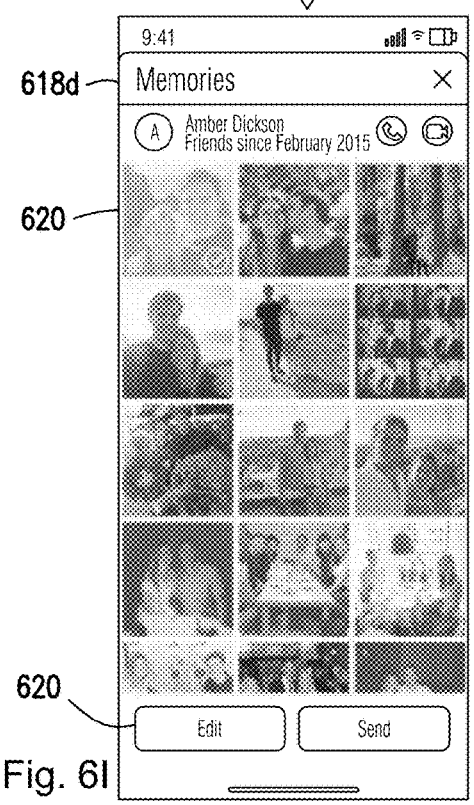

FIG. 6H illustrates the result of performing a gesture to proceed to the fourth slide 610*d*, which presents the fourth slide 610*d* corresponding to a birthday notification. In particular embodiments, the fourth slide 610*d* comprises slide element 612*d*, summaries 614*b*, 614*c*, 614*d* and an activatable link 616. The progress bar 611 may indicate the user is on the fourth slide by darkening indicator 611*d*. The fourth slide 610*d* may comprise the previous summaries 614*b*, 614*c* and the current summary 614*d* corresponding to the content of the fourth slide 610*d*. In particular embodiments, the summary 614*d* may be a reminder of the content associated with the fourth slide 610*d*. As an example and not by way of limitation, the summary 614*d* may indicate that it is a friend's birthday today. In particular embodiments, the slide element 612*d* may indicate an attribute of the content object associated with the fourth slide 610*d*. As an example and not by way of limitation, the slide element 612*d* may indicate the fourth slide 610*d* is a birthday notification. In particular embodiments, the user may select the activatable link 616 to see more information associated with the content of the fourth slide 610*d*. FIG. 6I illustrates the result of the user selecting the activatable link 616 within the fourth slide 610*d*, which pulls more information related to the contents of the fourth slide 610*d* in a separate context 618*d*. In particular embodiments, the separate context 618*d* may comprise a separate slide, another context of another application, one or more options related to the content of the fourth slide 610*d*, and the like. In particular embodiments, the one or more options may comprise messaging the birthday user, calling the birthday user with an associated contact number to reach the birthday user, video calling the birthday user, or share a post on the birthday user's profile page. The separate context 618*d* may comprise one or more elements 620 that correspond to the content of the fourth slide 610*d*. As an example and not by way of limitation, the separate context 618*d* comprises a plurality of photos 620 of the user and the birthday user. In particular embodiments, the user may select one or more photos 620 to send to the birthday user. As another example and not by way of limitation, the separate context 618*d* may have an edit and send button 620 that may be used to edit the photo 620 prior to sending to the birthday user. In particular embodiments, the separate context 618*d* may comprise additional elements 620 not discussed. Referring back to FIG. 6H, the user may also perform a gesture to access the separate context 618*d*. As an example and not by way of limitation, the user may perform a swipe up gesture or a tapping gesture to access the separate context 618*d*. In particular embodiments, the user may perform a gesture to proceed through the content digest. The assistant system 140 may receive an indication of the gesture and send instructions to the client system 130 to present the next slide 610*e*. In particular embodiments, the client system 130 may process the gesture and present the next slide 610*e*. As an example and not by way of limitation, the user may tap the right side of the fourth slide 610*d* to proceed to the next slide 610*e*. As another example and not by way of limitation, the user may tap on the left side of the fourth slide 610*d* to return back to the third slide 610*c*.

Figure 6J:
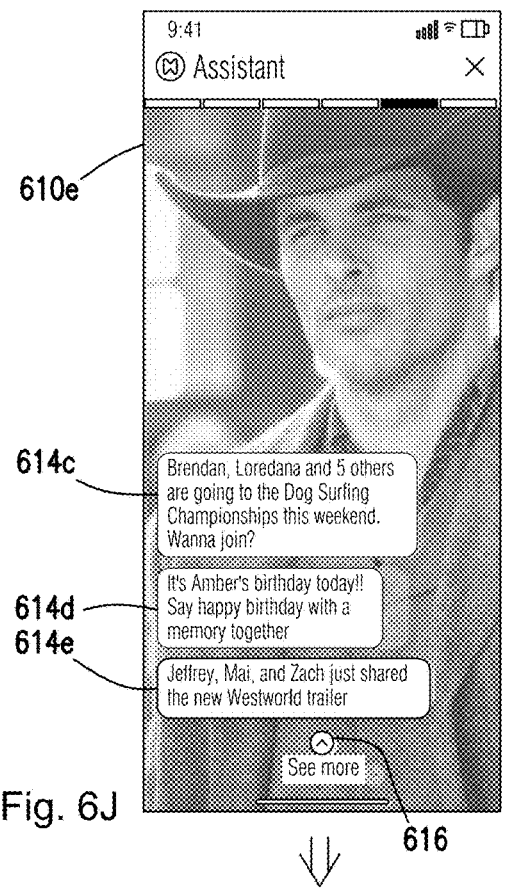

FIG. 6J illustrates the result of performing a gesture to proceed to the fifth slide 610*e*, which presents the fifth slide 610e corresponding to content that the user may watch. In particular embodiments, the fifth slide 610e comprises summaries 614c, 614d, 614e and an activatable link 616. In particular embodiments, the fifth slide 610e may comprise a video that plays during the viewing of the fifth slide 610e. As an example and not by way of limitation, the video may be a short clip that loops to the beginning once the user is done watching the video and repeats until the user leaves the fifth slide 610e. Alternatively, in particular embodiments, the fifth slide 610e may change to another slide representing the content object associated with the fifth slide 610e after the video is completed. The progress bar 611 may indicate the user is on the fifth slide by darkening indicator 611e. The fifth slide 610e may comprise the previous summaries 614c, 614d and the current summary 614e corresponding to the content of the fifth slide 610e. In particular embodiments, the summary 614e may be an indication of the content associated with the fifth slide 610e. As an example and not by way of limitation, the summary 614e may indicate that several of the user's friends have viewed the content of the video. In particular embodiments, the user may select the activatable link 616 to see more information associated with the content of the fifth slide 610e. FIG. 6K illustrates the result of the user selecting the activatable link 616 within the fifth slide 610e, which pulls more information related to the contents of the fifth slide 610e in a separate context 618e. In particular embodiments, the separate context 618e may comprise a separate slide, another context of another application, one or more options related to the content of the fifth slide 610e, and the like. In particular embodiments, the one or more options may comprise watching the content object associated with the fifth slide 610e, sharing the content object, or saving the content object to be viewed later. The separate context 618e may comprise one or more elements 620 that correspond to the content of the fifth slide 610e. As an example and not by way of limitation, the separate context 618e comprises a list 620 of friends. In particular embodiments, the user may select one or more friends on the list 620 of friends to send the video to share. As another example and not by way of limitation, the separate context 618e may have a send separate button 620 to send the video to friends separately. In particular embodiments, the separate context 618e may comprise additional elements 620 not discussed. Referring back to FIG. 6J, the user may also perform a gesture to access the separate context 618e. As an example and not by way of limitation, the user may perform a swipe up gesture or a tapping gesture to access the separate context 618e. In particular embodiments, the user may perform a gesture to proceed through the content digest. The assistant system 140 may receive an indication of the gesture and send instructions to the client system 130 to present the next slide 610f In particular embodiments, the client system 130 may process the gesture and present the next slide 610f. As an example and not by way of limitation, the user may tap the right side of the fifth slide 610e to proceed to the next slide 610f As another example and not by way of limitation, the user may tap on the left side of the fifth slide 610e to return back to the fourth slide 610d.

Figure 6L:
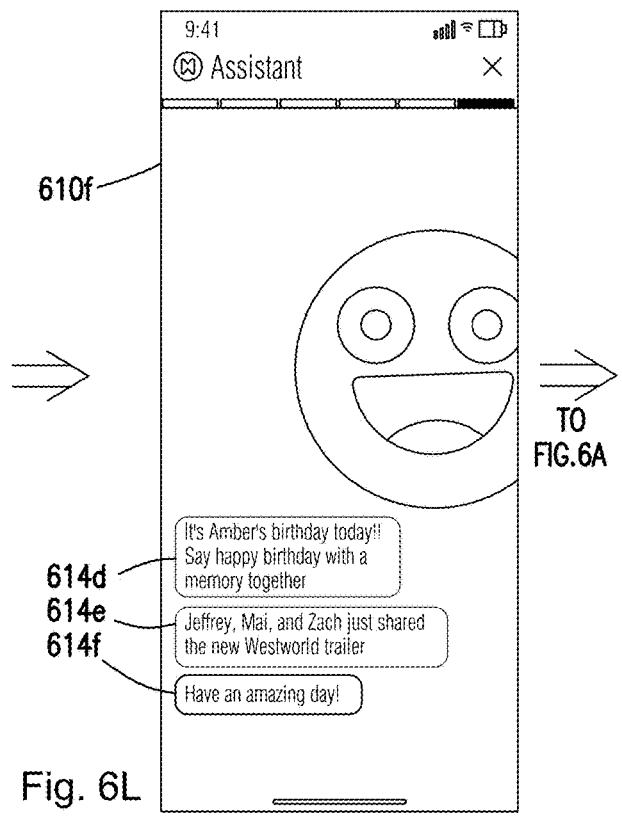
Figure 6K:
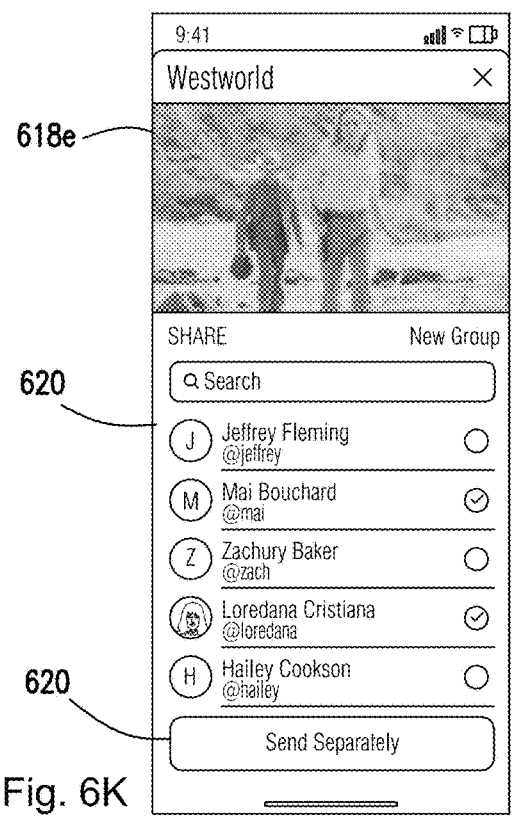

FIG. 6L illustrates the result of performing a gesture to proceed to the sixth slide 610f, which presents the sixth slide 610f corresponding to an end slide 610f. In particular embodiments, the sixth slide 610e comprises summaries 614d, 614e, 614f The progress bar 611 may indicate the user is on the sixth slide 610f by darkening indicator 611f The sixth slide 610f may comprise the previous summaries 614d, 614e and the current summary 614f corresponding to the content of the sixth slide 610f. In particular embodiments, the summary 614f may be a farewell to the user. As an example and not by way of limitation, the summary 614f may be the text output "Have an amazing day!" In particular embodiments, the user may perform a gesture to conclude the content digest. As an example and not by way of limitation, the user may tap the right side of the sixth slide 610f to return to the messaging application context 602. As another example and not by way of limitation, the user may tap on the left side of the sixth slide 610f to return back to the fifth slide 610e.

Figure 7:
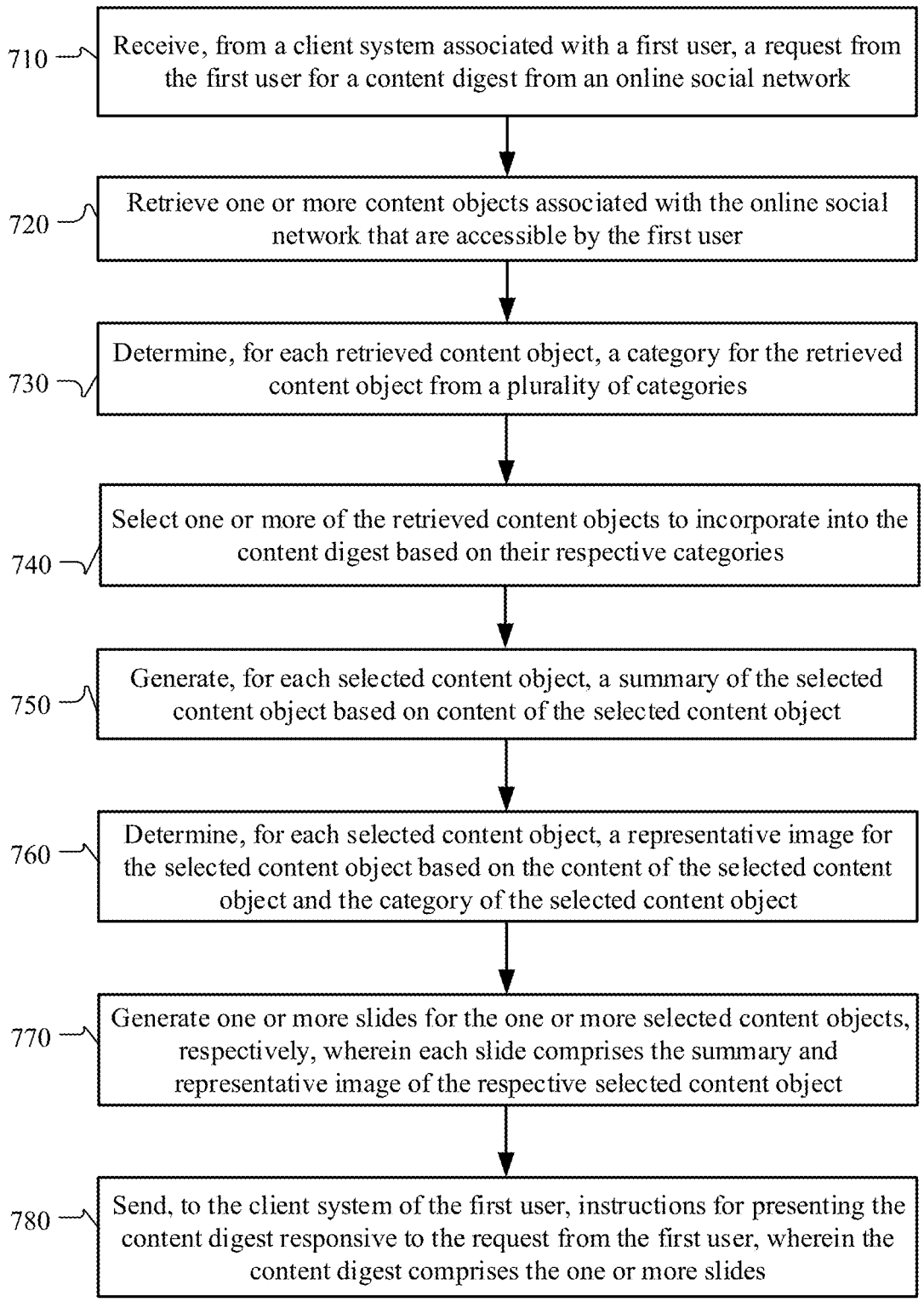
FIG. 7 illustrates an example method for providing a content digest.

FIG. 7 illustrates an example method 700 for providing a content digest. The method may begin at step 710, where the assistant system 140 may receive a request from the first user for a content digest from an online social network. In particular embodiments, the first user may be a user of an online-social network. At step 720, the assistant system 140 may retrieve one or more content objects associated with the online social network that are accessible by the first user. At step 730, the assistant system 140 may determine, for each retrieved content object, a category for the retrieved content object from a plurality of categories. At step 740, the assistant system 140 may select one or more of the retrieved content objects to incorporate into the content digest based on their respective categories. At step 750, the assistant system 140 may generate, for each selected content object, a summary of the selected content object based on content of the selected content object. At step 760, the assistant system 140 may determine, for each selected content object, a representative image for the selected content object based on the content of the selected content object and the category of the selected content object. At step 770, the assistant system 140 may generate one or more slides for the one or more selected content objects, respectively. In particular embodiments, each slide comprises the summary and representative image of the respective selected content object. At step 780, the assistant system 140 may send, to the client system of the first user, instructions for presenting the content digest responsive to the request from the first user. In particular embodiments, the content digest comprises the one or more slides. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for providing a content digest including the particular steps of the method of FIG. 7, this disclosure contemplates any suitable method for providing a content digest including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graphs

Figure 8:
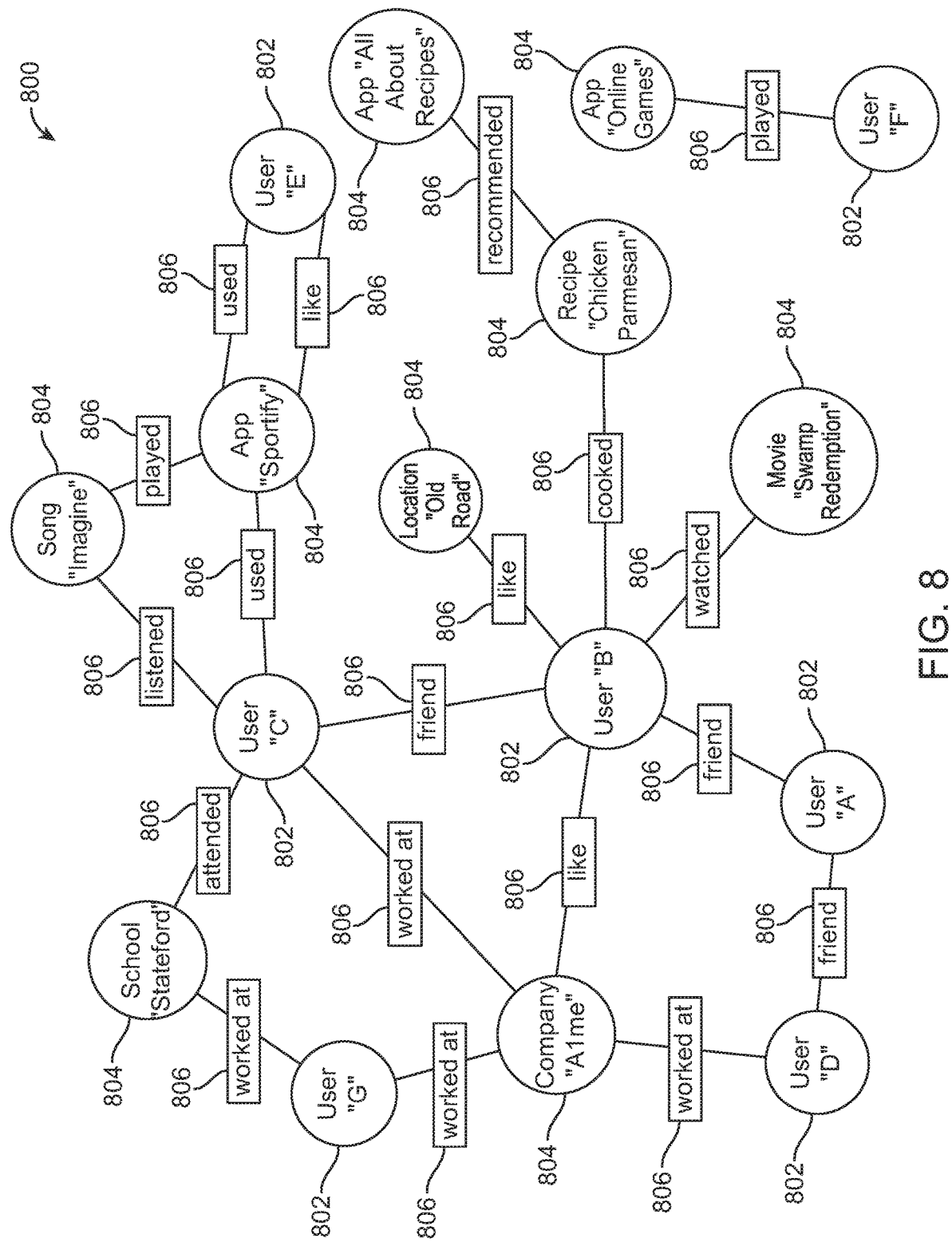
FIG. 8 illustrates an example social graph.

FIG. 8 illustrates an example social graph 800. In particular embodiments, the social-networking system 160 may store one or more social graphs 800 in one or more data stores. In particular embodiments, the social graph 800 may include multiple nodes—which may include multiple user nodes 802 or multiple concept nodes 804—and multiple edges 806 connecting the nodes. Each node may be associated with a unique entity (i.e., user or concept), each of which may have a unique identifier (ID), such as a unique number or username. The example social graph 800 illustrated in FIG. 8 is shown, for didactic purposes, in a two-dimensional visual map representation. In particular embodiments, a social-networking system 160, a client system 130, an assistant system 140, or a third-party system 170 may access the social graph 800 and related social-graph information for suitable applications. The nodes and edges of the social graph 800 may be stored as data objects, for example, in a data store (such as a social-graph database). Such a data store may include one or more searchable or queryable indexes of nodes or edges of the social graph 800.

In particular embodiments, a user node 802 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with the social-networking system 160. In particular embodiments, a user node 802 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more web interfaces.

In particular embodiments, a concept node 804 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more web interfaces.

In particular embodiments, a node in the social graph 800 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 804. Profile interfaces may be viewable by all or a selected subset of other users. As an example and not by way of limitation, a user node 802 may have a corresponding user-profile interface in which the corresponding user may add content, make declarations, or otherwise express himself or herself. As another example and not by way of limitation, a concept node 804 may have a corresponding concept-profile interface in which one or more users may add content, make declarations, or express themselves, particularly in relation to the concept corresponding to concept node 804.

In particular embodiments, a concept node 804 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 802 corresponding to the user and a concept node 804 corresponding to the third-party web interface or resource and store edge 806 in one or more data stores.

In particular embodiments, a pair of nodes in the social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 806 connecting the first user's user node 802 to the second user's user node 802 in the social graph 800 and store edge 806 as social-graph information in one or more data stores 164. In the example of FIG. 8, the social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile interface corresponding to a concept node 804 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 806 and a "used" edge (as illustrated in FIG. 8) between user nodes 802 corresponding to the user and concept nodes 804 corresponding to the song and application to indicate that the user listened to the song and used the application. Moreover, the social-networking system 160 may create a "played" edge 806 (as illustrated in FIG. 8) between concept nodes 804 corresponding to the song and the application to indicate that the particular song was played by the particular application. In this case, "played" edge 806 corresponds to an action performed by an external application on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804).

In particular embodiments, the social-networking system 160 may create an edge 806 between a user node 802 and a concept node 804 in the social graph 800. As an example and not by way of limitation, a user viewing a concept-profile interface (such as, for example, by using a web browser or a special-purpose application hosted by the user's client system 130) may indicate that he or she likes the concept represented by the concept node 804 by clicking or selecting a "Like" icon, which may cause the user's client system 130 to send to the social-networking system 160 a message indicating the user's liking of the concept associated with the concept-profile interface. In response to the message, the social-networking system 160 may create an edge 806 between user node 802 associated with the user and concept node 804, as illustrated by "like" edge 806 between the user and concept node 804. In particular embodiments, the social-networking system 160 may store an edge 806 in one or more data stores. In particular embodiments, an edge 806 may be automatically formed by the social-networking system 160 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Vector Spaces and Embeddings

Figure 9:
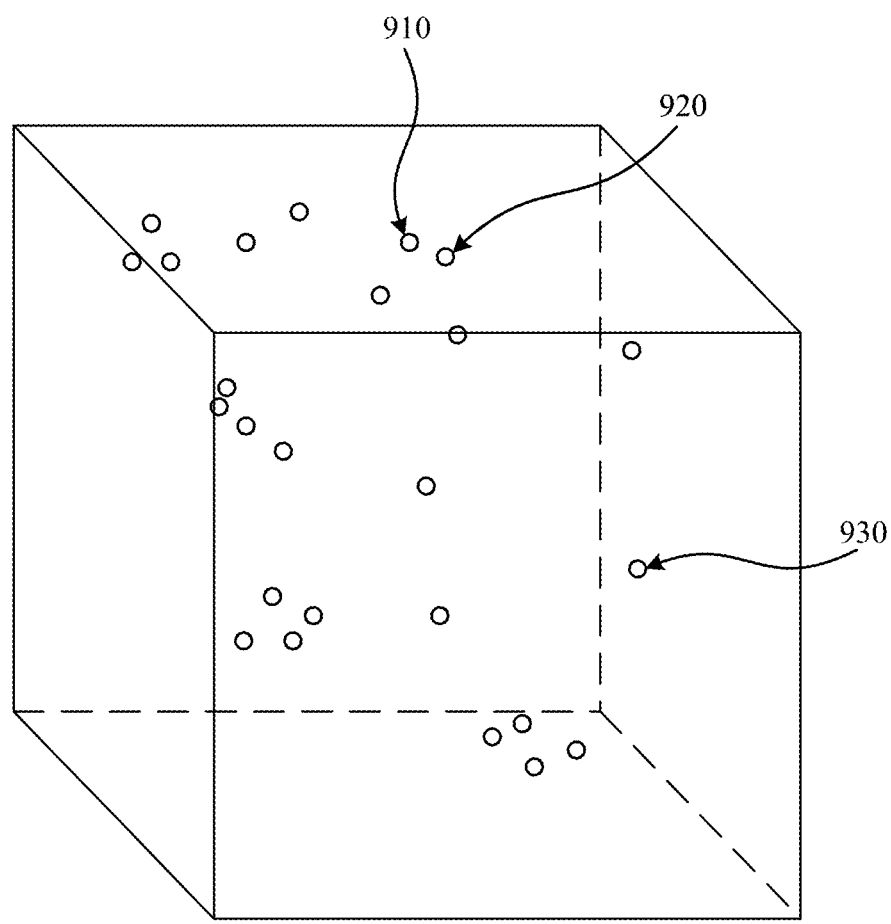
FIG. 9 illustrates an example view of an embedding space.

FIG. 9 illustrates an example view of a vector space 900. In particular embodiments, an object or an n-gram may be represented in a d-dimensional vector space, where d denotes any suitable number of dimensions. Although the vector space 900 is illustrated as a three-dimensional space, this is for illustrative purposes only, as the vector space 900 may be of any suitable dimension. In particular embodiments, an n-gram may be represented in the vector space 900 as a vector referred to as a term embedding. Each vector may comprise coordinates corresponding to a particular point in the vector space 900 (i.e., the terminal point of the vector). As an example and not by way of limitation, vectors 910, 920, and 930 may be represented as points in the vector space 900, as illustrated in FIG. 9. An n-gram may be mapped to a respective vector representation. As an example and not by way of limitation, n-grams $t_1$ and $t_2$ may be mapped to vectors $\vec{v_1}$ and $\vec{v_2}$ in the vector space 900, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 900. In particular embodiments, an n-gram may be mapped to a vector representation in the vector space 900 by using a machine leaning model (e.g., a neural network). The machine learning model may have been trained using a sequence of training data (e.g., a corpus of objects each comprising n-grams).

In particular embodiments, an object may be represented in the vector space 900 as a vector referred to as a feature vector or an object embedding. As an example and not by way of limitation, objects $e_1$ and $e_2$ may be mapped to vectors $\vec{v_1}$ and $\vec{v_2}$ in the vector space 900, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\pi$ may map the object to a vector using a transformed reduced set of features (e.g., feature selection). In particular embodiments, a function $\pi$ may map an object e to a vector $\pi$ (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 900. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As anomer example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 900. As an example and not by way of limitation, vector 910 and vector 920 may correspond to objects that are more similar to one another than the objects corresponding to vector 910 and vector 930, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 10:
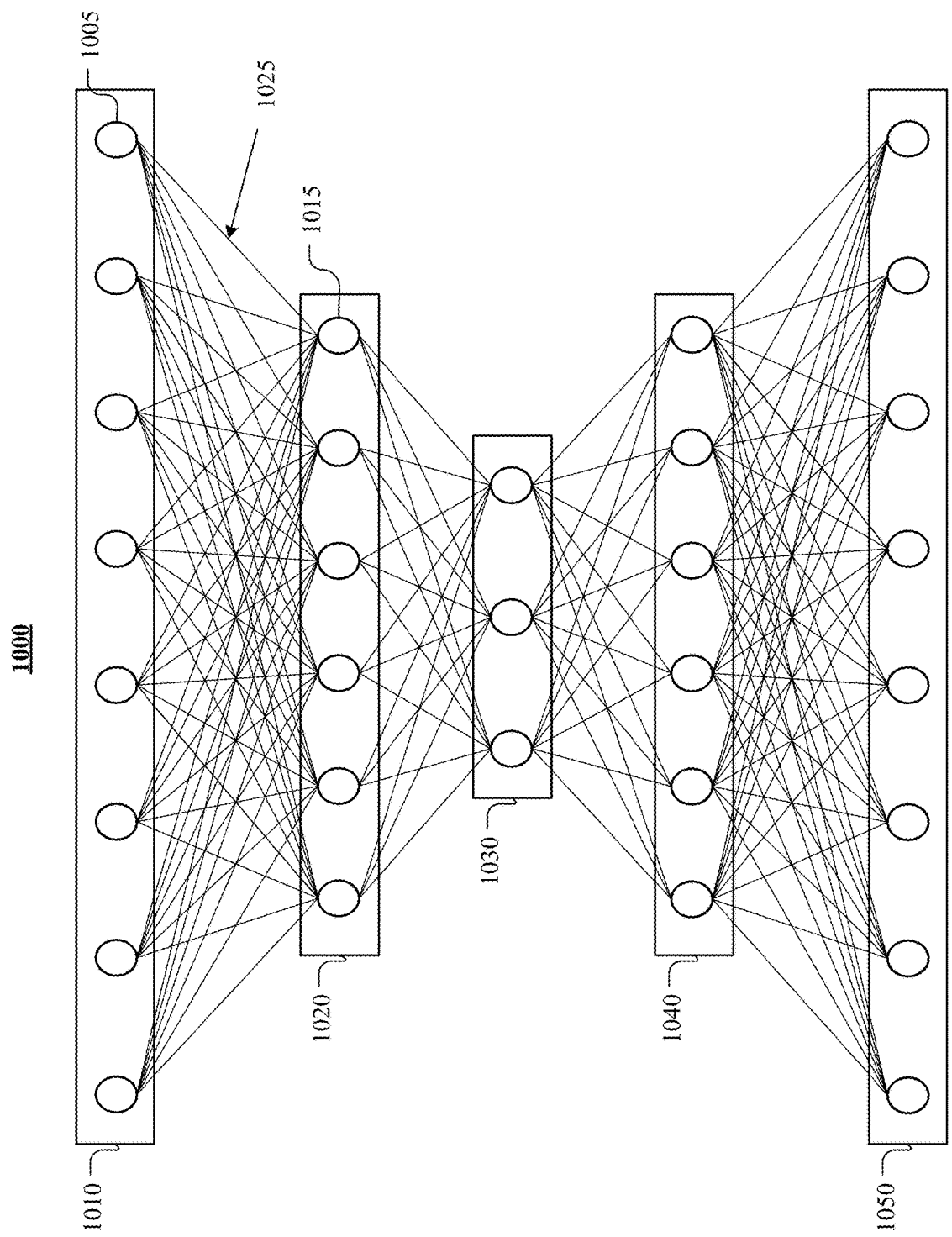
FIG. 10 illustrates an example artificial neural network.

FIG. 10 illustrates an example artificial neural network ("ANN") 1000. In particular embodiments, an ANN may refer to a computational model comprising one or more nodes. Example ANN 1000 may comprise an input layer 1010, hidden layers 1020, 1030, 1060, and an output layer 1050. Each layer of the ANN 1000 may comprise one or more nodes, such as a node 1005 or a node 1015. In particular embodiments, each node of an ANN may be connected to another node of the ANN. As an example and not by way of limitation, each node of the input layer 1010 may be connected to one of more nodes of the hidden layer 1020. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 10 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 10 depicts a connection between each node of the input layer 1010 and each node of the hidden layer 1020, one or more nodes of the input layer 1010 may not be connected to one or more nodes of the hidden layer 1020.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1020 may comprise the output of one or more nodes of the input layer 1010. As another example and not by way of limitation, the input to each node of the output layer 1050 may comprise the output of one or more nodes of the hidden layer 1060. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0,s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1025 between the node 1005 and the node 1015 may have a weighting coefficient of 0.4, which may indicate that 0.4 multiplied by the output of the node 1005 is used as an input to the node 1015. As another example and not by way of limitation, the output $y_k$ of node k may be $y_k=F_k(s_k)$, where $F_k$ may be the activation function corresponding to node k, $s_k=\Sigma_j (w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1000 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 804 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 800. A privacy setting may be specified for one or more edges 806 or edge-types of the social graph 800, or with respect to one or more nodes 802, 804 or node-types of the social graph 800. The privacy settings applied to a particular edge 806 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 804 connected to a user node 802 of the first user by an edge 806. The first user may specify privacy settings that apply to a particular edge 806 connecting to the concept node 804 of the object, or may specify privacy settings that apply to all edges 806 connecting to the concept node 804. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

Privacy Settings Based on Location

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Privacy Settings for User Authentication and Experience Personalization Information In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Systems and Methods

Figure 11:
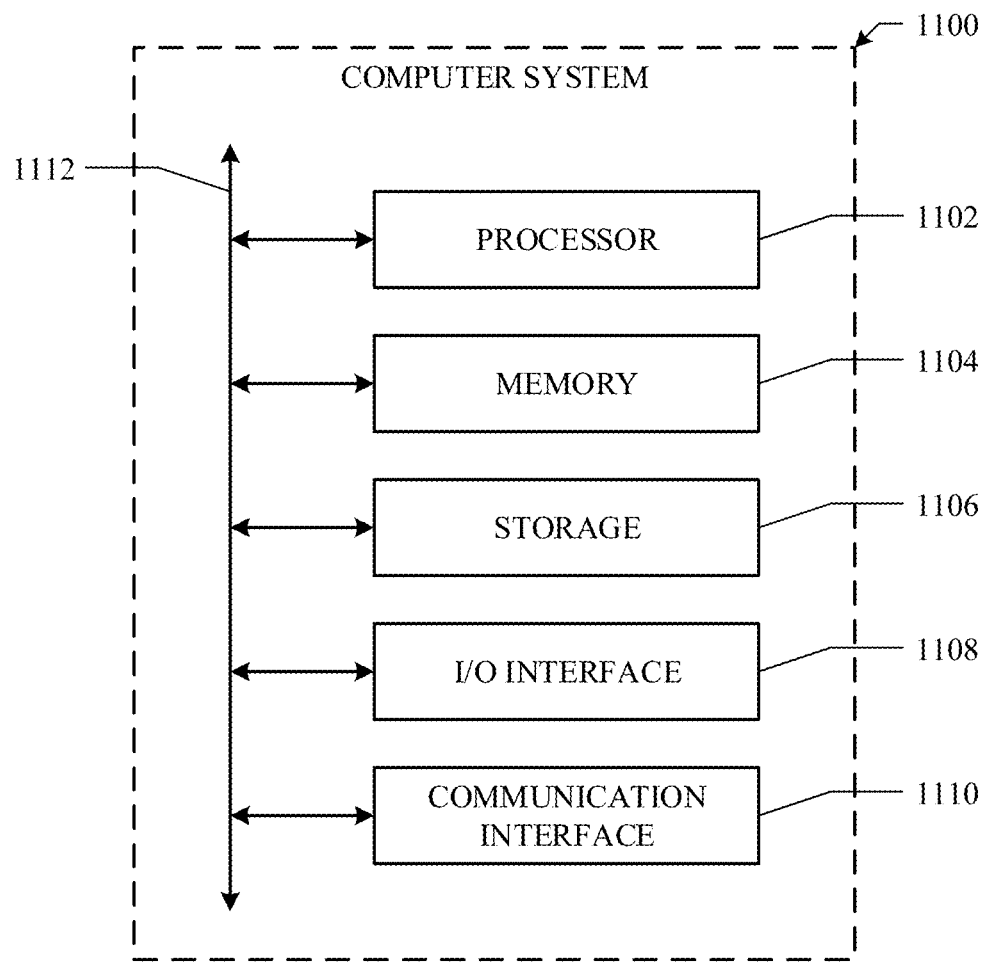
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, from a client system associated with a first user, a request from the first user for a content digest from an online social network;
   retrieving, by the one or more computing systems, one or more content objects associated with the online social network that are accessible by the first user;
   determining, by the one or more computing systems, for each retrieved content object, a category for the retrieved content object from a plurality of categories;
   selecting, by the one or more computing systems, one or more of the retrieved content objects to incorporate into the content digest based on their respective categories;
   generating, by the one or more computing systems, for each selected content object, a summary of the selected content object based on content of the selected content object;
   determining, by the one or more computing systems, for each selected content object, a representative image for the selected content object based on the content of the selected content object and the category of the selected content object;

generating, by the one or more computing systems, one or more slides for the one or more selected content objects, respectively, wherein each slide comprises the summary and representative image of the respective selected content object; and sending, by the one or more computing systems to the client system of the first user, instructions for presenting the content digest responsive to the request from the first user, wherein the content digest comprises the one or more slides, and wherein one or more of the slides of the content digest are removed from the content digest after a predetermined time period.

2. The method of claim 1, wherein the request for the content digest is automatically sent by the client system at a predetermined time period.

3. The method of claim 1, further comprising:
determining, for each retrieved content object, whether the content object is accessible by the first user based on a privacy setting associated with the content object.

4. The method of claim 1, wherein the plurality of categories is associated with a plurality of category-images, respectively.

5. The method of claim 4, wherein the representative image for the selected content object is determined from either the category-image associated with the category of the selected content object or an image associated with the content of the selected content object.

6. The method of claim 1, further comprising:
ranking the selected content objects based on their respective representative images.

7. The method of claim 1, wherein selecting the one or more of the retrieved content objects to incorporate into the content digest further comprises:
ranking the retrieved content objects based on one or more features associated with the respective content object; and
selecting the one or more retrieved content objects based on their respective rankings.

8. The method of claim 7, wherein the one or more features associated with the respective content object comprises one or more of:
social signals associated with the content object;
an affinity-coefficient of the first user with respect to the content object;
a relevance of the content object to the first user; or
an ephemerality of the content object.

9. The method of claim 1, wherein selecting the one or more of the retrieved content objects to incorporate into the content digest further comprises:
selecting up to a threshold number of content objects to incorporate into the content digest.

10. The method of claim 1, further comprising ordering the one or more slides of the content digest based on one or more features associated with the respective slides.

11. The method of claim 10, wherein the one or more features associated with the respective slides comprises one or more of:
social signals associated with the selected content object corresponding to the slide;
an affinity-coefficient of the first user with respect to the selected content object corresponding to the slide;
a relevance of the selected content object corresponding to the slide to the first user; or
a chronological relevance of the selected content object corresponding to the slide.

12. The method of claim 1, wherein the representative image for the selected content object is an avatar representing a sentiment associated with the selected content object.

13. The method of claim 1, further comprising:
receiving, from the client system associated with the first user, an indication of a gesture within a first slide of the one or more slides; and
sending, to the client system of the first user, instructions for presenting information associated with the selected content object associated with the first slide responsive to the gesture.

14. The method of claim 13, wherein the information associated with the selected content object comprises an activatable link that is activatable to perform a context switch to the selected content object.

15. The method of claim 13, wherein the information associated with the selected content object is presented on a second slide.

16. The method of claim 1, further comprising generating an introductory slide that comprises information associated with the geographic location of the first user.

17. One or more computer-readable non-transitory storage media embodying software that is operable when executed to:
receive, from a client system associated with a first user, a request from the first user for a content digest from an online social network;
retrieve, by the one or more computing systems, one or more content objects associated with the online social network that are accessible by the first user;
determine, by the one or more computing systems, for each retrieved content object, a category for the retrieved content object from a plurality of categories;
select, by the one or more computing systems, one or more of the retrieved content objects to incorporate into the content digest based on their respective categories;
generate, by the one or more computing systems, for each selected content object, a summary of the selected content object based on content of the selected content object;
determine, by the one or more computing systems, for each selected content object, a representative image for the selected content object based on the content of the selected content object and the category of the selected content object;
generate, by the one or more computing systems, one or more slides for the one or more selected content objects, respectively, wherein each slide comprises the summary and representative image of the respective selected content object; and
send, by the one or more computing systems to the client system of the first user, instructions for presenting the content digest responsive to the request from the first user, wherein the content digest comprises the one or more slides, and wherein one or more of the slides of the content digest are removed from the content digest after a predetermined time period.

18. A system comprising: one or more processors; and a non-transitory memory coupled to the processors comprising instructions executable by the processors, the processors operable when executing the instructions to:
receive, from a client system associated with a first user, a request from the first user for a content digest from an online social network;
retrieve, by the one or more computing systems, one or more content objects associated with the online social network that are accessible by the first user;

determine, by the one or more computing systems, for each retrieved content object, a category for the retrieved content object from a plurality of categories;

select, by the one or more computing systems, one or more of the retrieved content objects to incorporate into the content digest based on their respective categories;

generate, by the one or more computing systems, for each selected content object, a summary of the selected content object based on content of the selected content object;

determine, by the one or more computing systems, for each selected content object, a representative image for the selected content object based on the content of the selected content object and the category of the selected content object;

generate, by the one or more computing systems, one or more slides for the one or more selected content objects, respectively, wherein each slide comprises the summary and representative image of the respective selected content object; and send, by the one or more computing systems to the client system of the first user, instructions for presenting the content digest responsive to the request from the first user, wherein the content digest comprises the one or more slides, and wherein one or more of the slides of the content digest are removed from the content digest after a predetermined time period.

* * * * *